United States Patent
Imamura et al.

(10) Patent No.: US 11,005,552 B2
(45) Date of Patent: *May 11, 2021

(54) ANTENNA PORT MODE AND TRANSMISSION MODE TRANSITION

(71) Applicant: Sharp Kabushiki Kaisha, Sakai (JP)

(72) Inventors: Kimihiko Imamura, Chiba (JP); John Michael Kowalski, Vancouver, WA (US); Sayantan Choudhury, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,609

(22) Filed: Jul. 3, 2020

(65) Prior Publication Data

US 2020/0336192 A1 Oct. 22, 2020

Related U.S. Application Data

(63) Continuation of application No. 16/382,913, filed on Apr. 12, 2019, now Pat. No. 10,707,944, which is a
(Continued)

(51) Int. Cl.
*H04B 7/06* (2006.01)
*H04W 52/14* (2009.01)
(Continued)

(52) U.S. Cl.
CPC ............ *H04B 7/0689* (2013.01); *H04B 1/04* (2013.01); *H04B 7/0871* (2013.01);
(Continued)

(58) Field of Classification Search
CPC ...... H04B 7/0689; H04B 7/0871; H04B 1/04; H04W 72/0413; H04W 52/146;
(Continued)

(56) References Cited

U.S. PATENT DOCUMENTS

| 5,584,057 A * | 12/1996 | Dent ............... H04B 7/0671 455/101 |
| 6,785,520 B2 * | 8/2004 | Sugar ............. H03G 3/3089 455/101 |

(Continued)

FOREIGN PATENT DOCUMENTS

| CN | 101340622 A | 1/2009 |
| EP | 1655871 A2 | 5/2006 |

(Continued)

OTHER PUBLICATIONS

3GPP TS 36.101, V8.7.0, 3rd Generation Partnership Project; Technical Specification Group Radio Access Network; Evolved Universal Terrestrial Radio Access (E-UTRA); User Equipment (UE) radio transmission and reception (Release 8) Sep. 2009.

(Continued)

*Primary Examiner* — Ankur Jain
(74) *Attorney, Agent, or Firm* — Austin Rapp

(57) ABSTRACT

A wireless communication device may autonomously transition from a multiple antenna port mode to a single antenna port mode. The wireless communication device may implicitly notify a base station about the autonomous transition from the multiple antenna port mode to the single antenna port mode. The base station may reallocate resources that were previously allocated to the wireless communication device but that are no longer being used by the wireless communication device. In some cases, the base station may configure the wireless communication device's antenna port mode via radio resource control signaling.

4 Claims, 26 Drawing Sheets

(a) Multiple Antenna Port Mode 114b (b) Single Antenna Port Mode 114a

Related U.S. Application Data continuation of application No. 15/871,674, filed on Jan. 15, 2018, now Pat. No. 10,312,989, which is a continuation of application No. 14/697,356, filed on Apr. 27, 2015, now Pat. No. 9,917,630, which is a continuation of application No. 12/572,563, filed on Oct. 2, 2009, now Pat. No. 9,059,749.

(51) Int. Cl.
*H04W 52/22* (2009.01)
*H04B 7/08* (2006.01)
*H04W 52/42* (2009.01)
*H04B 1/04* (2006.01)
*H04W 72/04* (2009.01)
*H04W 52/34* (2009.01)
*H04W 88/06* (2009.01)

(52) U.S. Cl.
CPC ....... *H04W 52/146* (2013.01); *H04W 52/228* (2013.01); *H04W 52/42* (2013.01); *H04W 72/0413* (2013.01); *H04W 52/34* (2013.01); *H04W 88/06* (2013.01)

(58) Field of Classification Search
CPC ... H04W 52/228; H04W 52/42; H04W 88/06; H04W 52/34
See application file for complete search history.

(56) References Cited

U.S. PATENT DOCUMENTS

| | | | | |
|---|---|---|---|---|
| 7,020,482 B2* | 3/2006 | Medvedev | ........... | H04B 7/0443 455/455 |
| 7,054,384 B1* | 5/2006 | Ma | ........... | H03F 1/3229 375/299 |
| 7,792,207 B2* | 9/2010 | Harel | ........... | H04W 52/221 375/267 |
| 7,978,623 B1* | 7/2011 | Kotecha | ........... | H04W 72/06 370/252 |
| 8,059,611 B2* | 11/2011 | Ishii | ........... | H04J 11/00 370/334 |
| 8,274,940 B2 | 9/2012 | Ishii et al. | | |
| 8,279,806 B2* | 10/2012 | Sagfors | ........... | H04W 52/286 370/328 |
| 8,437,798 B2* | 5/2013 | Fabien | ........... | H04B 17/24 455/552.1 |
| 2005/0014524 A1* | 1/2005 | Lott | ........... | H04W 52/34 455/522 |
| 2005/0282506 A1* | 12/2005 | Azuma | ........... | H04B 7/0615 455/115.1 |
| 2006/0003787 A1* | 1/2006 | Heo | ........... | H04W 52/281 455/522 |
| 2007/0058603 A1* | 3/2007 | Song | ........... | H04B 17/336 370/342 |
| 2008/0151798 A1* | 6/2008 | Camp | ........... | H04B 7/0691 370/311 |
| 2008/0151819 A1* | 6/2008 | Bachl | ........... | H04W 52/146 370/329 |
| 2008/0153535 A1* | 6/2008 | Gorokhov | ........... | H04W 52/367 455/522 |
| 2008/0160990 A1* | 7/2008 | Karmi | ........... | H04W 52/267 455/424 |
| 2008/0161033 A1* | 7/2008 | Borran | ........... | H04W 52/16 455/522 |
| 2008/0227414 A1* | 9/2008 | Karmi | ........... | H04B 7/022 455/101 |
| 2008/0261645 A1* | 10/2008 | Luo | ........... | H04W 52/362 455/522 |
| 2008/0273452 A1* | 11/2008 | Khan | ........... | H04L 1/0656 370/203 |
| 2008/0311858 A1* | 12/2008 | Cheng | ........... | H04B 7/0682 455/69 |
| 2008/0316950 A1* | 12/2008 | Damnjanovic | ..... | H04W 52/146 370/311 |
| 2009/0017859 A1* | 1/2009 | Seppinen | ........... | H04W 52/243 455/522 |
| 2009/0082059 A1* | 3/2009 | Terry | ........... | H04W 52/242 455/522 |
| 2009/0093219 A1* | 4/2009 | Katada | ........... | H04W 52/28 455/69 |
| 2009/0110114 A1* | 4/2009 | Onggosanusi | ........ | H04B 7/063 375/299 |
| 2009/0197632 A1* | 8/2009 | Ghosh | ........... | H04W 52/34 455/522 |
| 2009/0202016 A1* | 8/2009 | Seong | ........... | H04L 1/0631 375/267 |
| 2009/0213769 A1* | 8/2009 | Shen | ........... | H04L 1/1858 370/280 |
| 2009/0213955 A1* | 8/2009 | Higuchi | ........... | H04L 1/0643 375/267 |
| 2009/0215464 A1* | 8/2009 | Tanno | ........... | H04W 74/0833 455/450 |
| 2009/0238241 A1* | 9/2009 | Hooli | ........... | H04L 5/0012 375/133 |
| 2009/0285146 A1* | 11/2009 | Sugar | ........... | H04B 7/0669 370/312 |
| 2010/0002800 A1* | 1/2010 | Kim | ........... | H04W 72/042 375/295 |
| 2010/0010194 A1* | 1/2010 | Zhang | ........... | C07D 491/147 530/345 |
| 2010/0029289 A1* | 2/2010 | Love | ........... | H04L 5/0041 455/450 |
| 2010/0041350 A1* | 2/2010 | Zhang | ........... | H04L 5/0023 455/101 |
| 2010/0041430 A1* | 2/2010 | Ishii | ........... | H04W 52/04 455/522 |
| 2010/0067512 A1* | 3/2010 | Nam | ........... | H04L 5/0023 370/342 |
| 2010/0091724 A1* | 4/2010 | Ishii | ........... | H04L 5/0037 370/329 |
| 2010/0099429 A1* | 4/2010 | Ishii | ........... | H04W 72/1268 455/452.1 |
| 2010/0118805 A1* | 5/2010 | Ishii | ........... | H04W 52/283 370/329 |
| 2010/0197339 A1* | 8/2010 | Pedersen | ........... | H04W 52/34 455/522 |
| 2010/0215017 A1* | 8/2010 | Li | ........... | H04L 5/0046 370/330 |
| 2010/0285828 A1* | 11/2010 | Panian | ........... | H04W 52/246 455/522 |
| 2010/0296471 A1* | 11/2010 | Heo | ........... | H04L 5/0053 370/329 |
| 2011/0038271 A1* | 2/2011 | Shin | ........... | H04W 52/146 370/252 |
| 2011/0070918 A1* | 3/2011 | Hafeez | ........... | H04B 7/024 455/522 |
| 2011/0105173 A1* | 5/2011 | Haim | ........... | H04W 52/325 455/522 |
| 2011/0141928 A1* | 6/2011 | Shin | ........... | H04L 5/0053 370/252 |
| 2011/0207415 A1* | 8/2011 | Luo | ........... | H04W 52/42 455/68 |
| 2011/0244887 A1* | 10/2011 | Dupray | ........... | G01C 21/206 455/456.2 |
| 2011/0281612 A1* | 11/2011 | Ishii | ........... | H04W 52/32 455/522 |
| 2012/0009962 A1* | 1/2012 | Liu | ........... | H04W 52/146 455/509 |
| 2012/0149427 A1* | 6/2012 | Perets | ........... | H04W 52/10 455/522 |
| 2012/0176998 A1* | 7/2012 | Muellner | ........... | H04W 52/146 370/329 |
| 2012/0188947 A1* | 7/2012 | Larsson | ........... | H04W 52/146 370/328 |
| 2013/0094483 A1* | 4/2013 | Marinier | ........... | H04W 72/1268 370/336 |

(56) References Cited

U.S. PATENT DOCUMENTS

| | | | | |
|---|---|---|---|---|
| 2013/0178221 A1* | 7/2013 | Jung | ............... | H04W 52/281 455/450 |
| 2013/0301533 A1* | 11/2013 | Oteri | ............... | H04W 52/262 370/328 |
| 2014/0010194 A1* | 1/2014 | Shin | ............... | H04W 52/54 370/329 |

FOREIGN PATENT DOCUMENTS

| | | | |
|---|---|---|---|
| EP | 2009829 | A2 | 12/2008 |
| EP | 2141935 | A1 | 1/2010 |
| JP | 6284062 | B1 | 10/1994 |
| JP | 2008166855 | A | 7/2008 |
| JP | 200989420 | | 4/2009 |
| JP | 2009141632 | A | 6/2009 |
| JP | 2010532602 | A | 10/2010 |
| WO | 0159945 | A1 | 8/2001 |
| WO | 2005084379 | A2 | 9/2005 |
| WO | 2005088864 | A1 | 9/2005 |
| WO | 2006106613 | A1 | 10/2006 |
| WO | 2008123148 | A1 | 10/2008 |
| WO | 2008130693 | A2 | 10/2008 |
| WO | 2009003330 | A1 | 1/2009 |
| WO | 2009120126 | A1 | 10/2009 |

OTHER PUBLICATIONS

3GPP TS 36.211 V8.6.0, "Evolved Universal Terrestrial Radio Access (E-UTRA) Physical Channels and Modulation," Mar. 1, 2009.
3GPP TS 36.212 V8.6.0, "Evolved Universal Terrestrial Radio Access (E-UTRA) Multiplexing and channel coding," Mar. 1, 2009.
3GPP TS 36.213 V8.6.0, "Evolved Universal Terrestrial Radio Access (E-UTRA) Physical layer procedures," Mar. 1, 2009.
3GPP TS 36.213, V8.5.0, 3rd Generation Partnership Project; Technical Specification Group Radio Access Network; Evolved Universal Terrestrial Radio Access (E-UTRA); Physical layer procedures (Release 8) Dec. 2008.
Advisory Action issued for U.S. Appl. No. 12/688,880 dated Jul. 25, 2013.
Alacatel-Lucent Shanghai Bell et. At., PUSCH and PUCCH Power Scaling for Carrier Aggregation, 3GPP R1-100414, 3GPP, chapter 4 Jan. 13, 2010.
Ex Parte Quayle Action issued for U.S. Appl. No. 14/261,019 on Sep. 24, 2014.
International Search Report issued for International Patent Application No. PCT/JP2010/067610 dated Nov. 22, 2010.
International Search Report issued for International Patent Application No. PCT/JP2011/050903 dated Mar. 15, 2011.
LG Electronics, "Uplink transmission under UE transmit power limitation", 3GPP TSG RAN WG1 #57bis, Los Angeles, CA, USA, R1-092503, Jun. 29, 2009.
Mitsubishi Electric, "Comparison of Uplink 2-Tx Transmit Diversity Schemes for LTE-Advanced," R1-093545, Aug. 24, 2009.
Motorola, "Multi-Antenna Support in UL PUSCH/PUCCH/PRACH/SRS Transmission", 3GPP TSG-RAN1 #57bis, Los Angeles, USA, R1-092644, Jul. 3, 2009.
Motorola, "RF Arch for Multi-Antenna LTE-A UL," R4-093098, Aug. 24, 2009.
Nokia Siemens Networks, Nokia, "PUSCH Power Control for LTE-Advanced", 3GPP TSG RAN WG1 #57bis Meeting, R1-092574, Jul. 3, 2009 Jul. 3, 2009.
Nokia Siemens Networks, Nokia, "Uplink Power Control for LTE-Advanced," 3GPP TSG RAN WG1 #58bis Meeting, R1-093906, Jan. 12, 2009.
Nokia, "Tx Diversity for LTE-Advanced PUSCH," R1-093327, Aug. 24, 2009.
Nokia, "Uplink Power Control for LTE-Advanced," R1-093322, Aug. 24, 2009.
Notice of Allowance issued for U.S. Appl. No. 12/688,880 dated Jan. 27, 2014.
Notice of Allowance issued for U.S. Appl. No. 14/697,356 dated Oct. 30, 2017.
Notice of Allowance issued for U.S. Appl. No. 15/871,674 dated Jan. 29, 2019.
Notice of Allowance issued for U.S. Appl. No. 16/382,913 dated Feb. 28, 2020.
Office Action issued for U.S. Appl. No. 12/688,880 dated Apr. 12, 2013.
Office Action issued for U.S. Appl. No. 12/688,880 dated Jul. 18, 2012.
Office Action issued for U.S. Appl. No. 12/688,880 dated Feb. 4, 2013.
Office Action issued for U.S. Appl. No. 12/688,880 dated Sep. 9, 2013.
Office Action issued for U.S. Appl. No. 14/697,356 dated May 25, 2017.
Office Action issued for U.S. Appl. No. 14/697,356 dated Jul. 29, 2016.
Office Action issued for U.S. Appl. No. 14/697,356 dated Dec. 30, 2015.
Office Action issued for U.S. Appl. No. 15/871,674 dated Jul. 18, 2018.
Office Action issued for U.S. Appl. No. 16/382,913 dated Dec. 11, 2019.
Office Action issued for U.S. Appl. No. 16/382,913 dated Sep. 20, 2019.
Potevio, Uplink Power Scaling for Carrier Aggregation in LTE-Advanced, 3GPP R1-100610, 3GPP, Jan. 14, 2010.
Samsung, "Discussions on UL 2Tx Transmit Diversity Schemes for PUSCH in LTE-A," R1-093402, Aug. 24, 2009.
Samsung, "UL Transmission Power Control in LTE-A," R1-093395, Aug. 24, 2009.
Sharp, "The Benefits of One PA Mode of UEs Supporting Multiple PAs," R4-092747, Jun. 29, 2009.
Sharp, "UE PA Architecture and Power Consumption in LTE-Advanced," R4-092748, Aug. 24, 2009.
Sharp, UL Power Control for LTE-Advanced UES Supporting Multiple, 3GPP R1-094022, 3GPP, Oct. 5, 2009.

* cited by examiner

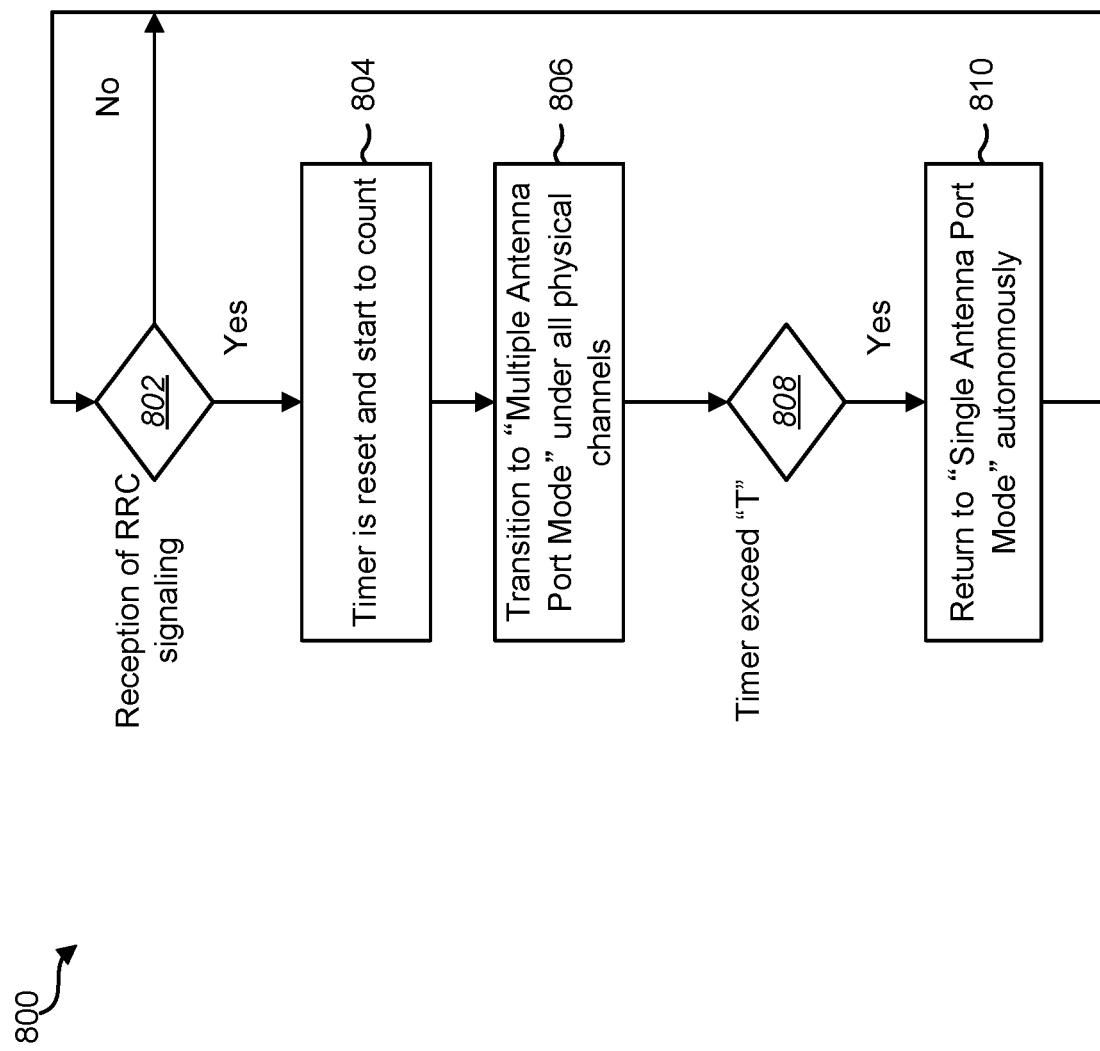

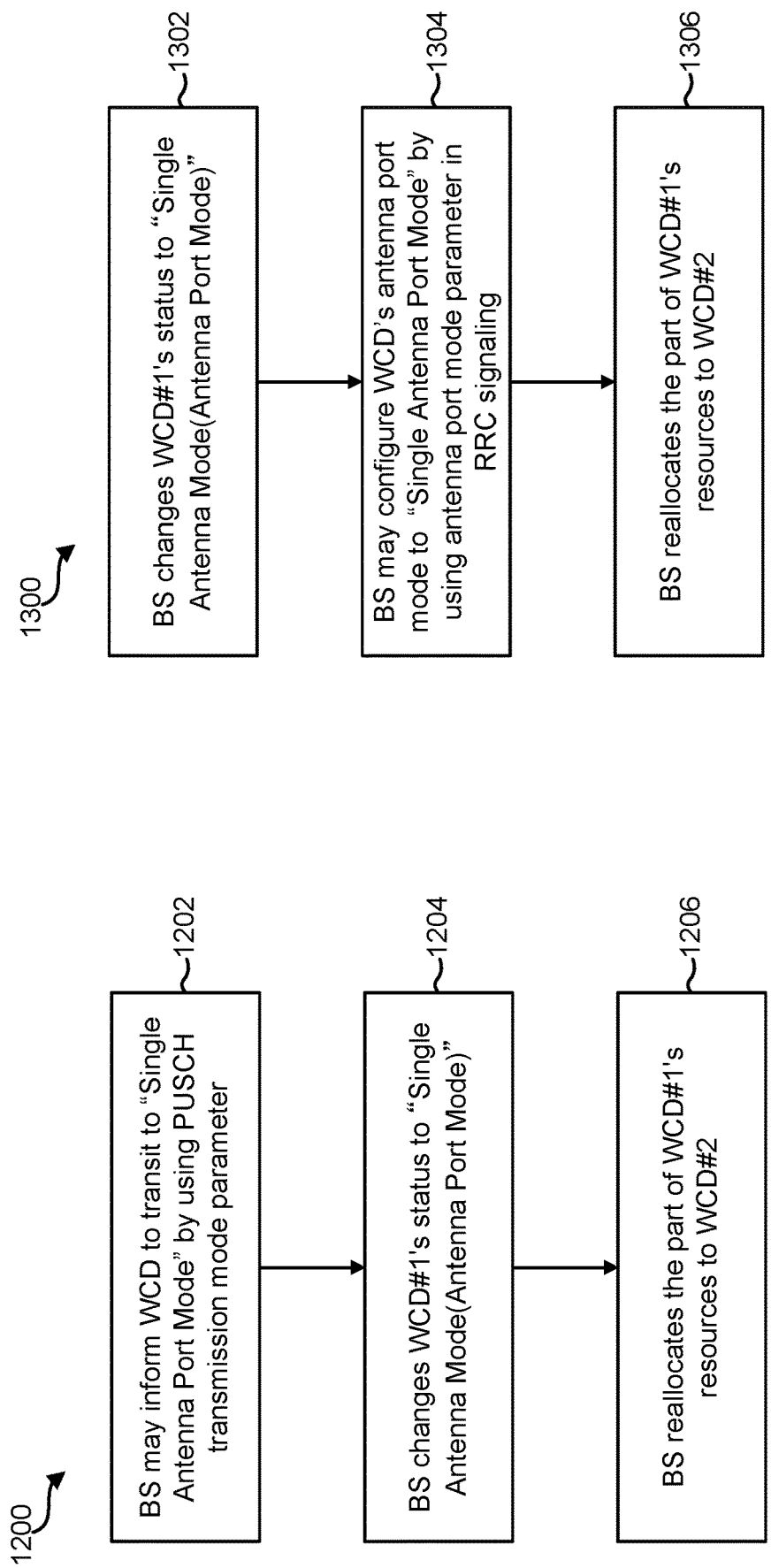

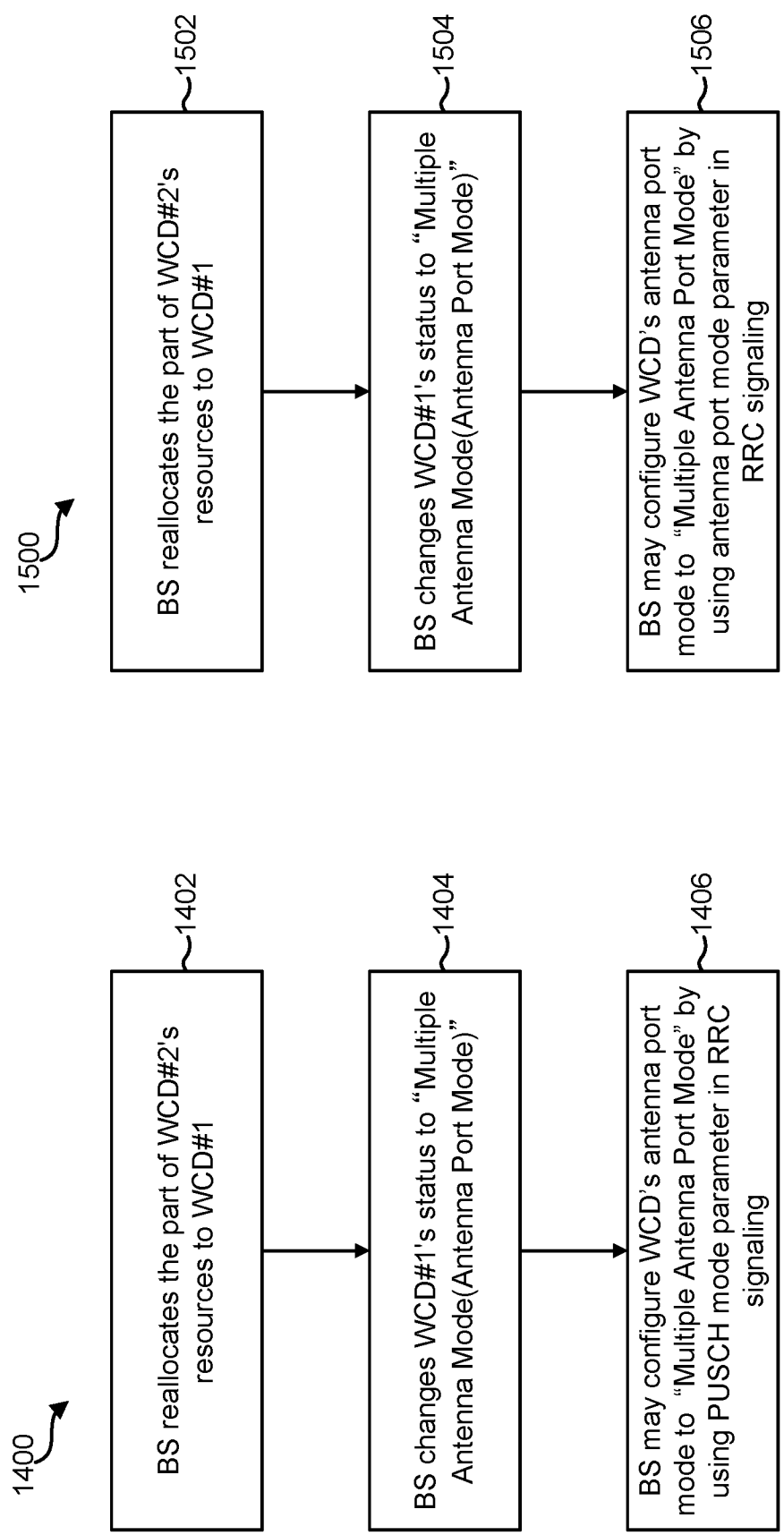

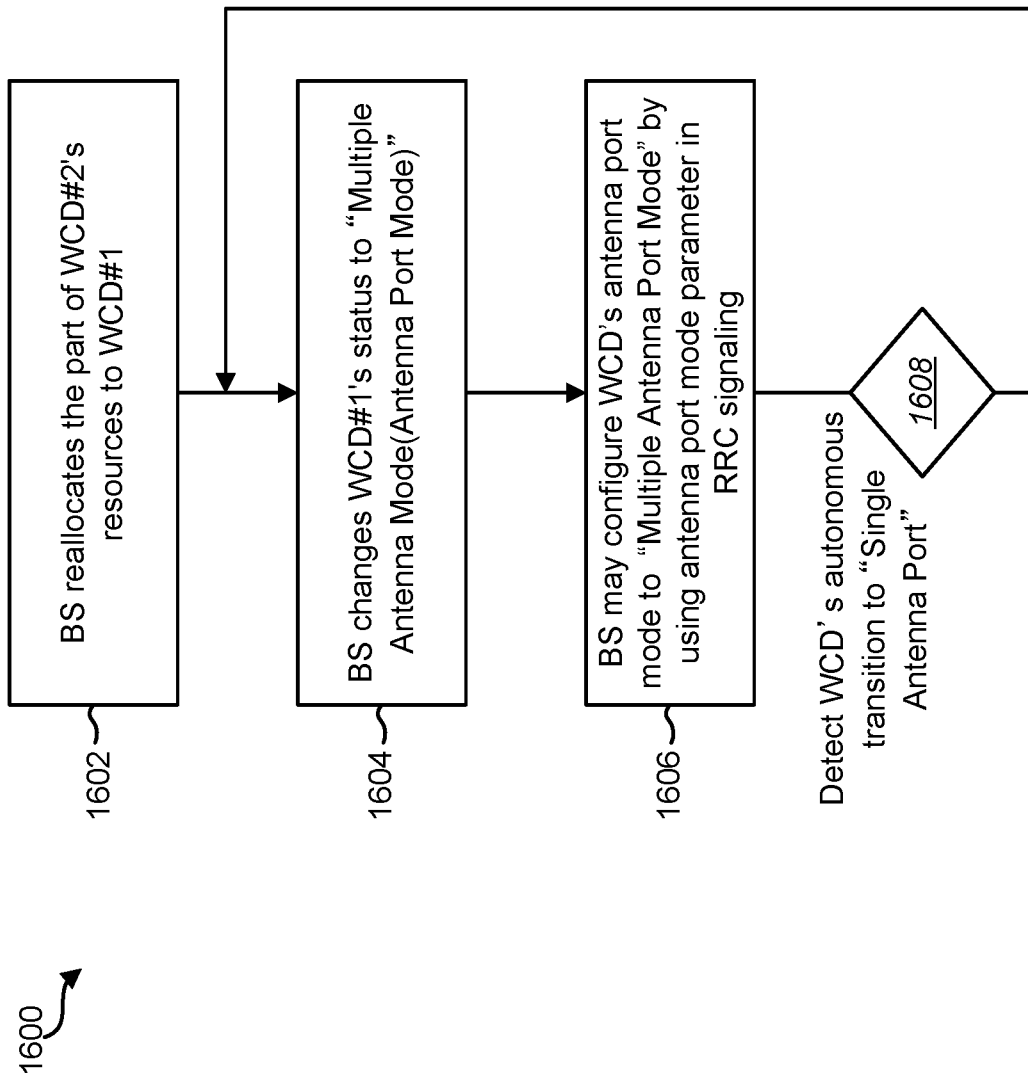

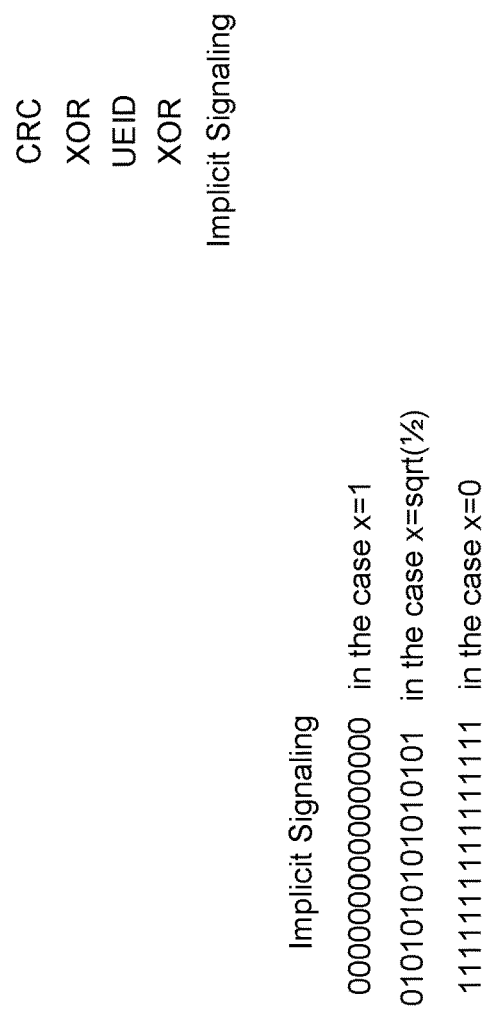
FIG. 28
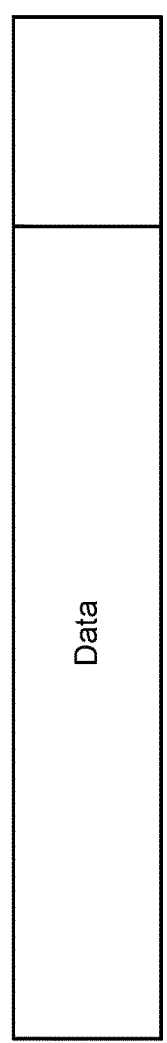
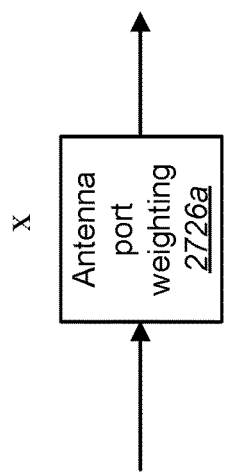
FIG. 27A
FIG. 27B

ANTENNA PORT MODE AND TRANSMISSION MODE TRANSITION

RELATED APPLICATIONS

This application is a continuation of U.S. patent application Ser. No. 16/382,913 entitled "Antenna Port Mode and Transmission Mode Transition," filed Apr. 12, 2019, which is a continuation of Ser. No. 15/871,674 entitled "Antenna Port Mode and Transmission Mode Transition," filed Jan. 15, 2018, and now issued as U.S. Pat. No. 10,312,989, which is a continuation of Ser. No. 14/697,356 entitled "Antenna Port Mode and Transmission Mode Transitions," filed Apr. 27, 2015, and now issued as U.S. Pat. No. 9,917,630, which is a continuation of U.S. patent application Ser. No. 12/572,563 entitled "Antenna Port Mode and Transmission Mode Transitions," filed Oct. 2, 2009, and now issued as U.S. Pat. No. 9,059,749, which are all hereby incorporated by reference in their entirety.

TECHNICAL FIELD

The present disclosure relates generally to wireless communication systems. More specifically, the present disclosure relates to antenna port mode and transmission mode transitions.

BACKGROUND

Wireless communication systems have become an important means by which many people worldwide have come to communicate. A wireless communication system may provide communication for a number of wireless communication devices, each of which may be serviced by a base station.

A wireless communication device is an electronic device that may be used for voice and/or data communication over a wireless communication system. A wireless communication device may alternatively be referred to as a mobile station, a user equipment, an access terminal, a subscriber station, a mobile terminal, a remote station, a user terminal, a terminal, a subscriber unit, a mobile device, etc. A wireless communication device may be a cellular phone, a smartphone, a personal digital assistant (PDA), a wireless modem, etc.

A base station is a fixed station (i.e., a wireless communication station that is installed at a fixed location) that communicates with wireless communication devices. A base station may alternatively be referred to as an access point, a Node B, an evolved Node B (eNB), or some other similar terminology.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). LTE-Advanced (LTE-A) is the next generation of LTE.

BRIEF DESCRIPTION OF THE DRAWINGS

FIG. 8 illustrates a method whereby a wireless communication device may attempt to return to single antenna port mode after a defined time period;

FIG. 12 illustrates a method whereby a base station may configure a wireless communication device to transition from multiple antenna port mode to single antenna port mode via RRC signaling;

FIG. 13 illustrates another method whereby a base station may configure a wireless communication device to transition from multiple antenna port mode to single antenna port mode via RRC signaling;

FIG. 14 illustrates a method whereby a base station may configure a wireless communication device to transition from single antenna port mode to multiple antenna port mode via RRC signaling;

FIG. 15 illustrates another method whereby a base station may configure a wireless communication device to transition from single antenna port mode to multiple antenna port mode via RRC signaling;

FIG. 16 illustrates a method whereby a base station may configure a wireless communication device to transition from single antenna port mode to multiple antenna port mode and then subsequently detect that the wireless communication device has autonomously transitioned back to single antenna port mode;

FIG. 27A illustrates an example of an antenna port weighting process;

FIG. 27B illustrates another example of an antenna port weighting process;

FIG. 28 illustrates one way that a base station can configure an antenna port weighting process parameter (x) to be used at the wireless communication device;

DETAILED DESCRIPTION

Figure 1:
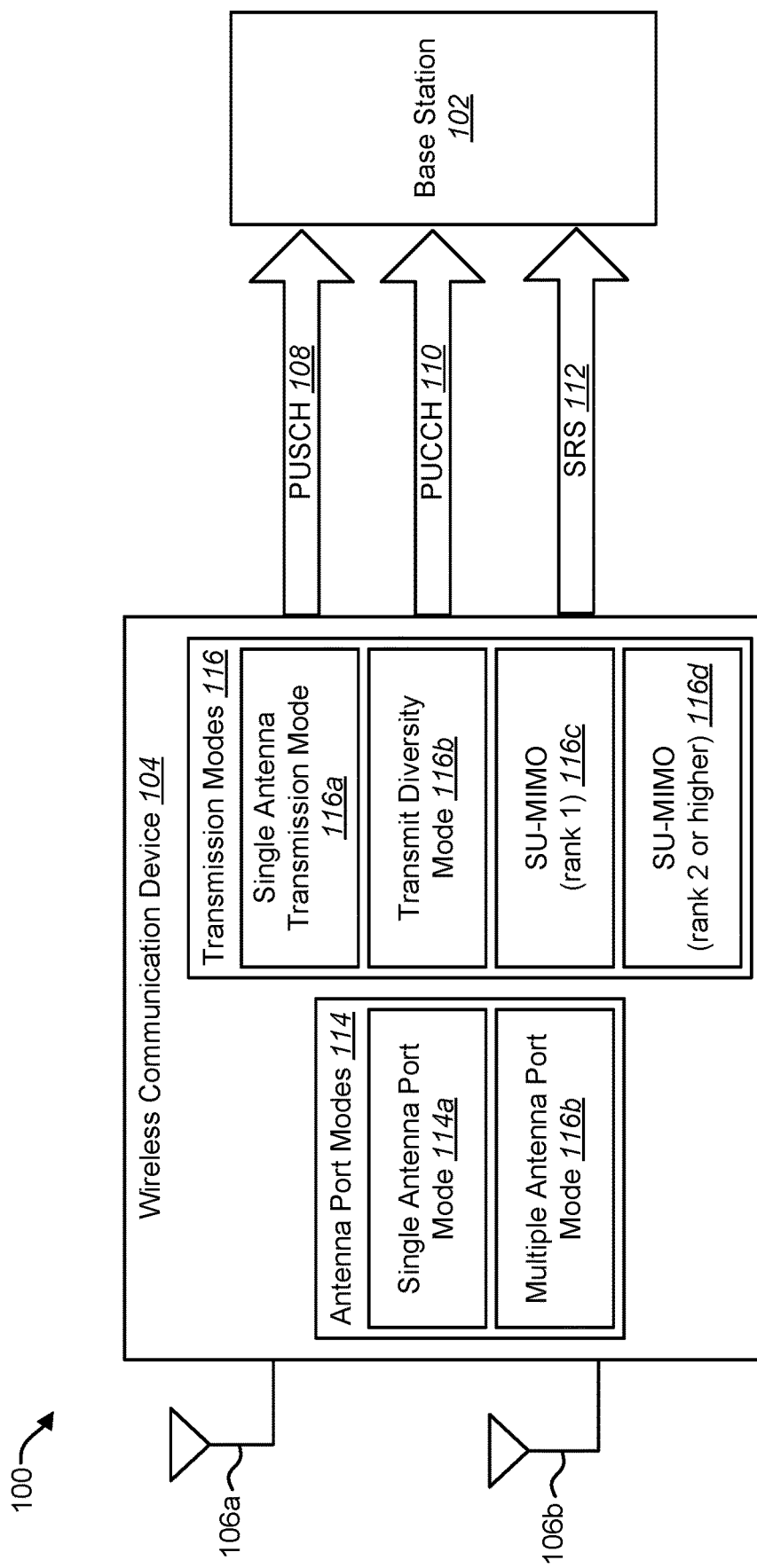
FIG. 1 illustrates a wireless communication system that includes a wireless communication device in wireless electronic communication with a base station.

A method for antenna port mode and transmission mode state transitions is disclosed. A wireless communication device autonomously transitions from a multiple antenna port mode to a single antenna port mode. The wireless communication device implicitly notifies a base station about the autonomous transition or explicitly signals the transition from the multiple antenna port mode to the single antenna port mode.

To implicitly notify the base station about the autonomous transition, the wireless communication device may send a sounding reference signal transmission on only one code even though multiple codes were allocated to the wireless communication device. Alternatively, to implicitly notify the base station about the autonomous transition, the wireless communication device may use only one orthogonal resource for physical uplink control channel transmission even though multiple orthogonal resources were allocated to the wireless communication device. Alternatively still, to implicitly notify the base station about the autonomous transition, the wireless communication device may transmit a physical uplink shared channel signal on a single antenna.

The wireless communication device may return to the single antenna port mode a defined time period after being configured to the multiple antenna port mode by the base station. The wireless communication device may cease to autonomously transition to the multiple antenna port mode if a pattern of cycling between the base station instructing the wireless communication device to transition to the multiple antenna port mode and the wireless communication device autonomously transitioning to the single antenna port mode happens a defined number of times.

The wireless communication device may be in a transmission diversity mode that utilizes an open-loop transmission diversity scheme. The open-loop transmission diversity scheme may be space-frequency block coding, space-time block coding, frequency selective transmit diversity, cyclic delay diversity, etc.

An antenna port weighting vector that is used at the wireless communication device may depend on a parameter x. For example, the antenna port weighting vector may be either $x$ or $\sqrt{1-x^2}$. The wireless communication device may autonomously transition from the multiple antenna port mode to the single antenna port mode by autonomously selecting the value of x. The wireless communication device may autonomously select the value of x in order to transition to the single antenna port mode in response to the wireless communication device observing a large antenna gain imbalance. Alternatively, the wireless communication device may autonomously select the value of x in order to transition to the single antenna port mode in response to the wireless communication device determining that its current battery status is low.

The wireless communication device may perform an uplink transmission power control procedure in which the wireless communication device may determine a total transmission power for each component carrier, and the wireless communication device may allocate transmission power to each antenna. In order to determine a total transmission power for each component carrier, the wireless communication device may determine a total transmission power of PUCCH for each component carrier based on the number of orthogonal resources allocated for PUCCH in each component carrier.

The uplink transmission power control procedure may also include the wireless communication device determining whether to drop at least one physical channel. This may involve the wireless communication device comparing projected transmission power to maximum transmission power, and the wireless communication device dropping the at least one physical channel according to a defined priority of physical channels if the projected transmission power exceeds the maximum transmission power.

The wireless communication device allocating transmission power to each antenna may depend on whether the wireless communication device is in the single antenna port mode or the multiple antenna port mode. The wireless communication device allocating transmission power to each antenna may depend on a power amplifier configuration of the wireless communication device. The wireless communication device may allocate transmission power to each antenna so as to keep total transmission power the same regardless of which precoding vector is applied in SU-MIMO transmission mode A method for supporting antenna port mode and transmission mode state transitions is disclosed. A base station detects a wireless communication device's autonomous transition from a multiple antenna port mode to a single antenna port mode. The base station reallocates resources that were previously allocated to the wireless communication device but that are no longer being used by the wireless communication device.

The base station may schedule time/frequency resources and instruct modulation and coding scheme levels assuming single input single output transmission. The base station may configure the wireless communication device's antenna port mode via radio resource control signaling.

The wireless communication device may be in a transmission diversity mode that utilizes an open-loop transmission diversity scheme. An antenna port weighting vector that is used at the wireless communication device may depend on a parameter x. The base station may configure the wireless communication device's antenna port mode by setting the value of x. This may involve the base station estimating an antenna gain imbalance at the wireless communication device. The base station may notify the wireless communication device about the value of x via a physical downlink control channel.

The base station may perform an uplink transmission power control procedure in which the base station determines total transmission power for each component carrier.

A wireless communication device is disclosed. The wireless communication device includes a processor, memory in electronic communication with the processor, and instructions stored in the memory. The instructions are executable to autonomously transition from a multiple antenna port mode to a single antenna port mode, and to implicitly notify a base station about the autonomous transition or to explicitly signal the transition from the multiple antenna port mode to the single antenna port mode.

A base station is disclosed. The base station includes a processor, memory in electronic communication with the processor, and instructions stored in the memory. The instructions are executable to detect a wireless communication device's autonomous transition from a multiple antenna port mode to a single antenna port mode, and to reallocate resources that were previously allocated to the wireless communication device but that are no longer being used by the wireless communication device.

At least some aspects of the systems and methods disclosed herein will be described in relation to the 3GPP LTE and LTE-Advanced standards (Release-8 and Release-10). However, the scope of the present disclosure should not be limited in this regard. At least some aspects of the systems and methods disclosed herein may be utilized in other types of wireless communication systems.

In 3GPP specifications, a wireless communication device is typically referred to as a User Equipment (UE), and a base station is typically referred to as a Node B or an evolved Node B (eNB). However, because the scope of the present disclosure should not be limited to the 3GPP standards, the more general terms "wireless communication device" and "base station" will be used herein.

FIG. 1 illustrates a wireless communication system 100 in which at least some of the methods disclosed herein may be utilized. The system 100 includes a base station 102 in wireless electronic communication with a wireless communication device 104. Communication between the base station 102 and the wireless communication device 104 may occur in accordance with the LTE-Advanced standards. The wireless communication device 104 may include multiple antennas 106a, 106b.

There may be several uplink physical channels that exist between the wireless communication device 104 and the base station 104. The physical channels may include the physical uplink shared channel (PUSCH) 108, the physical uplink control channel (PUCCH) 110 and the channel on which is sent the sounding reference signal (SRS) 112.

The wireless communication device 104 may have at least two antenna port modes 114 and several physical channels' transmission modes 116. The antenna port modes 114 may include a single antenna port mode 114a and a multiple antenna port mode 114b. The transmission modes 116 may include a single antenna transmission mode 116a, a transmit diversity mode 116b, an SU-MIMO (rank one) mode 116c, an SU-MIMO (rank 2 or higher) mode 116d and an MU-MIMO mode 116e. (SU-MIMO stands for single-user, multiple-input-multiple-output, and MU-MIMO stands for multiple-user, multiple-input-multiple-output)

At any given time, the wireless communication device 104 may be in exactly one antenna port mode 114 and exactly one transmission mode 116. A combination of an antenna port mode 114 and a transmission mode 116 may be considered to be a transmission state.

To save battery life or take advantage of spatial resources appropriately, the wireless communication device 104 should be able to transition between the antenna port modes 114 and the transmission modes 116. At least some aspects of the systems and methods disclosed herein relate to defining consistent behavior for transitioning between these modes 114, 116.

In order for reliable communication to occur between the wireless communication device 104 and the base station 102, the base station 102 should be aware of the antenna port mode 114 in which the wireless communication device 104 is currently operating. If the wireless communication device 104 changes its antenna port mode 114 (and thus changes its transmission state) without signaling from the base station 102 (referred to as "autonomously" changing its antenna port mode 114), the base station 102 should adjust its receiver and its scheduling characteristics to adapt to the change in antenna port mode 114. Furthermore, in order for the wireless communication device 104 to be able to determine whether the base station 102 has received information about the wireless communication device's antenna port mode 114, it may be useful to define a consistent behavior by the base station 102 upon its determination of a change in antenna port mode 114. At least some aspects of the methods disclosed herein relate to a state transition mechanism that minimizes explicit signaling between the base station 102 and the wireless communication device 104 when the wireless communication device 104 changes its transmission state.

Figure 2:
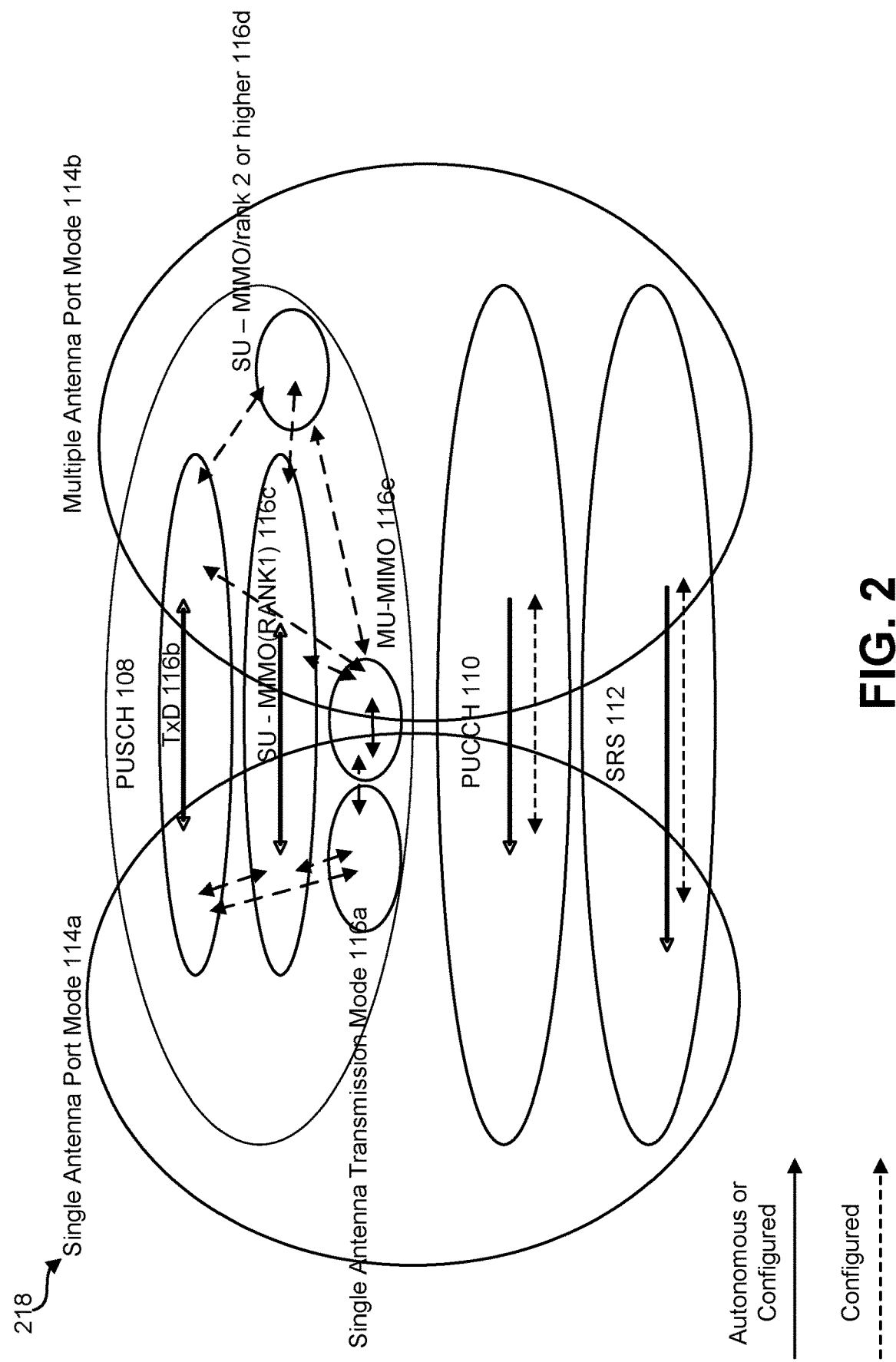
FIG. 2 illustrates a first example of how a wireless communication device may transition between antenna port modes and transmission modes.

FIG. 2 illustrates a first example of how a wireless communication device 104 may transition between antenna port modes 114 and transmission modes 116. This example may be referred to as case one 218. Each transmission mode 116 may belong to single antenna port mode 114a and/or multiple antenna port mode 114b. For example, the single antenna transmission mode 116a may belong to the single antenna port mode 114a only. The transmit diversity mode 116b and the SU-MIMO mode (rank one) 116c may belong to both single antenna port mode 114a and multiple antenna port mode 114b. The SU-MIMO mode (rank 2 or higher) 116d may belong to the multiple antenna port mode 114b only.

Figure 3:
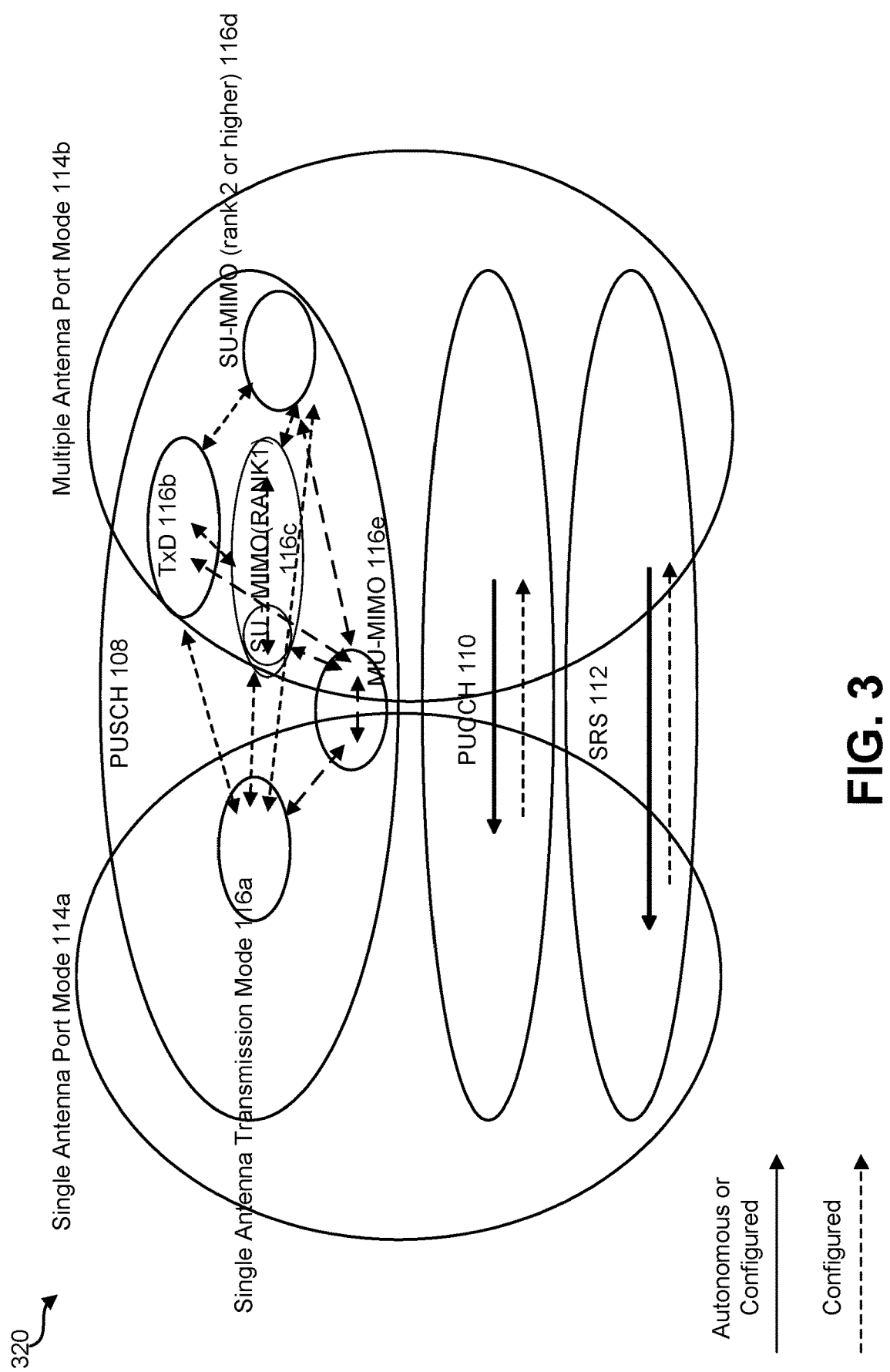
FIG. 3 illustrates a second example of how a wireless communication device may transition between antenna port modes and transmission modes.

FIG. 3 illustrates a second example of how a wireless communication device 104 may transition between antenna port modes 114 and transmission modes 116. This example may be referred to as case two 320. In case two 320, single antenna transmission mode 116a may belong to single antenna port mode 114a only. Transmit diversity mode 116b and SU-MIMO mode (rank one) 116c may belong to multiple antenna port mode 114b only. SU-MIMO mode (rank two or higher) 116d may belong to multiple antenna port mode 114b only.

A wireless communication device 104 may autonomously transition from the multiple antenna port mode 114b to the single antenna port mode 114a. When this occurs, the wireless communication device 104 may implicitly notify the base station 102 about the autonomous transition from the multiple antenna port mode 114b to the single antenna port mode 114a.

Figure 4:
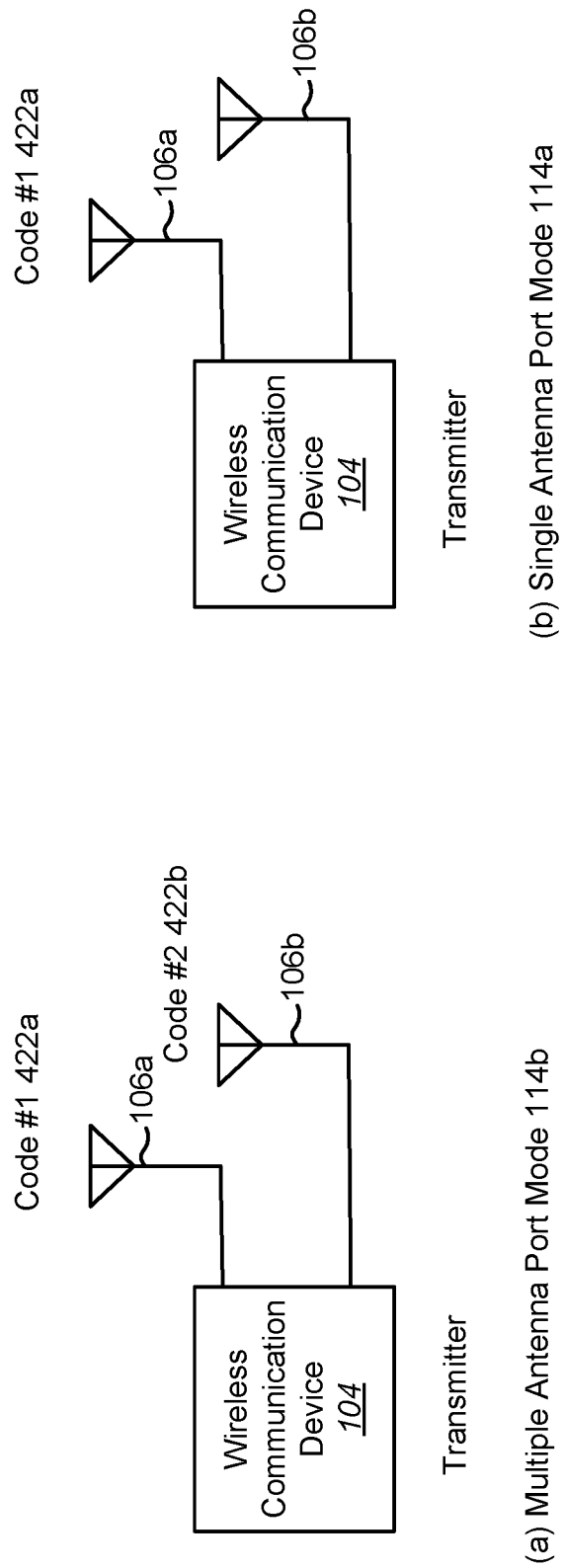
FIG. 4 illustrates an example showing how a wireless communication device may implicitly notify a base station about an autonomous transition from multiple antenna port mode to single antenna port mode.

FIG. 4 illustrates an example showing how the wireless communication device 104 may implicitly notify the base station 102 about the autonomous transition from the multiple antenna port mode 114b to the single antenna port mode 114a. When the wireless communication device 104 is in the multiple antenna port mode 114b, a multi-code 422a, 422b SRS 112 may be sent out. When the wireless communication device 104 transitions to the single antenna port mode 114a (without any explicit signaling to the base station 102), the wireless communication device 104 may send an SRS 112 with only one code 422a. The base station 102 may infer that the wireless communication device 104 has transitioned to the single antenna port mode 114a by detecting that the wireless communication device 104 has sent an SRS 112 with only one code 422a.

Figure 5:
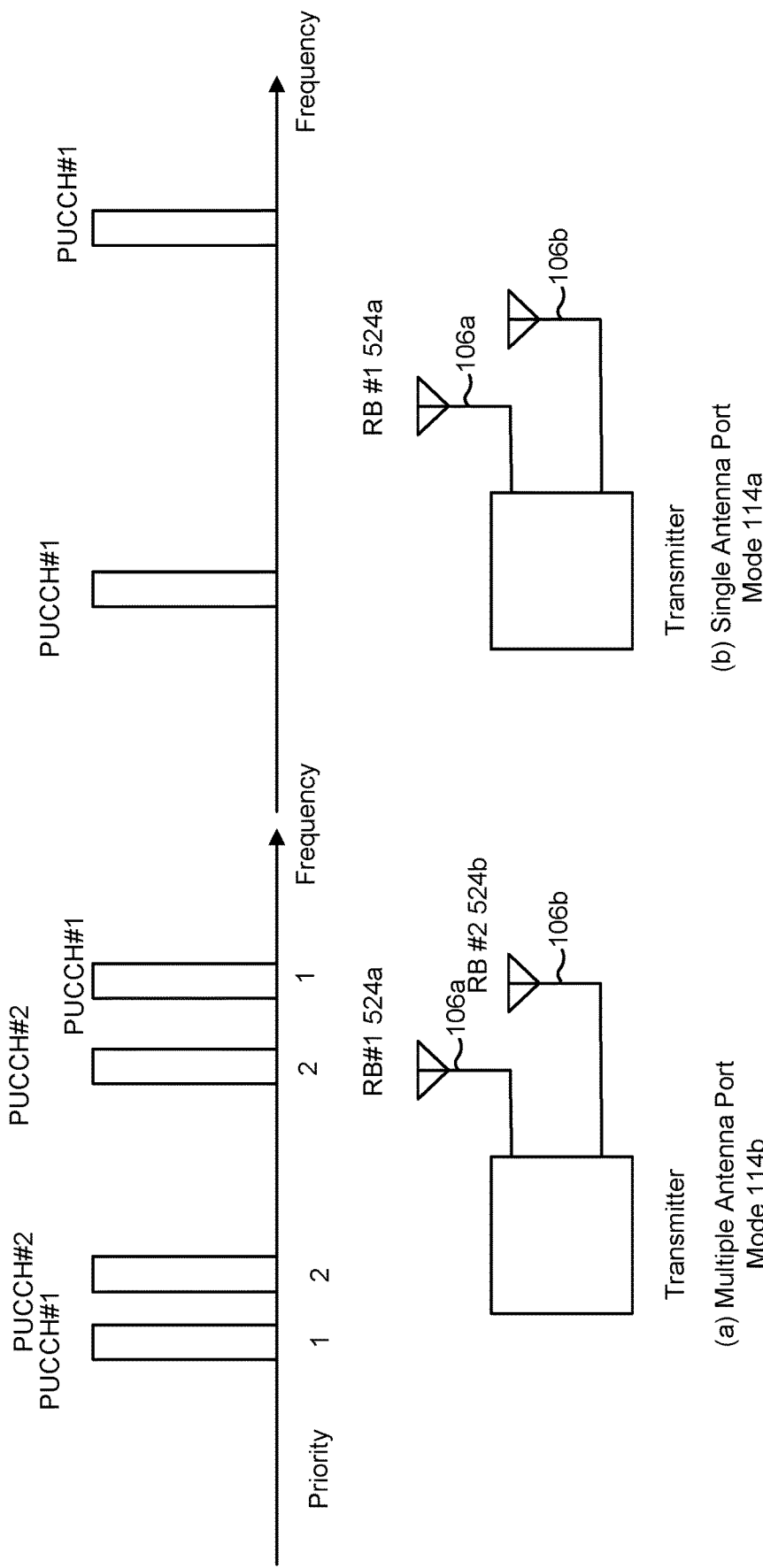
FIG. 5 illustrates another example showing how a wireless communication device may implicitly notify a base station about an autonomous transition from multiple antenna port mode to single antenna port mode.

FIG. 5 illustrates another example showing how the wireless communication device 104 may implicitly notify the base station 102 about the autonomous transition from the multiple antenna port mode 114b to the single antenna port mode 114a. When the wireless communication device 104 is in the multiple antenna port mode 114b, the PUCCH 110 may be sent out on multiple resource blocks (RBs) 524a, 524b. When the wireless communication device 104 transitions to the single antenna port mode 114a (without any explicit signaling to the base station 102), the wireless communication device 104 may use only one RB 524a to send the PUCCH 110.

The order of RB 524 priority for PUCCH 110 may be predefined. For example, in FIG. 5, lower frequency (or outside frequency) has a higher priority. So lower RB 524a (or outside RB 524a) will be used when the wireless communication device 104 transitions to the single antenna port mode 114a. In this case, no signaling is needed to inform the base station 102 which RB 524 will be dropped when the wireless communication device 104 transitions to the single antenna port mode 114a.

Figures 6, 7:
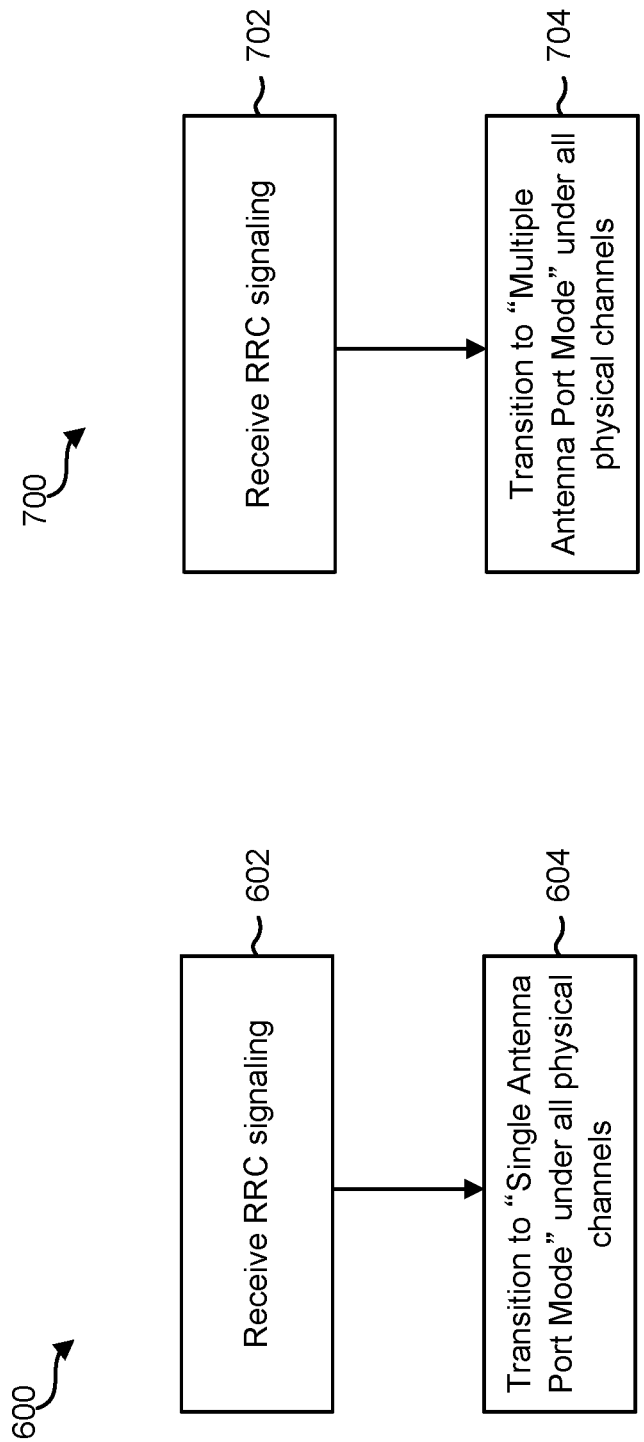
FIG. 6 illustrates a method whereby a wireless communication device transitions from multiple antenna port mode to single antenna port mode based on radio resource control (RRC) signaling.
FIG. 7 illustrates a method whereby a wireless communication device transitions from single antenna port mode to multiple antenna port mode based on RRC signaling.

Reference is now made to FIG. 6. The method 600 of FIG. 6 illustrates that a wireless communication device 104 may be configured from the multiple antenna port mode 114b to the single antenna port mode 114a via radio resource control (RRC) signaling. More specifically, FIG. 6 illustrates that a wireless communication device 104 may receive 602 RRC signaling. In response to receiving 602 the RRC signaling, the wireless communication device 104 may transition 604 to the single antenna port mode 114a for one or more physical channels 108 (e.g., PUSCH 108, PUCCH 110, SRS 112). If the wireless communication device 104 transitions to the single antenna port mode 114a, the wireless communication device 104 may transmit the PUCCH 110 or the SRS 112 as shown in FIG. 4(b) or 5(b).

The RRC signaling referred to in FIG. 6 might include the transmission mode 116 for the PUSCH 108. An example will be described assuming that the wireless communication device 104 is configured according to case two 320 in FIG. 3 (in which the transmit diversity mode 116b, the SU-MIMO mode (rank one) 116c and the SU-MIMO mode (rank two) 116d belong to the multiple antenna port mode 114b, and the single antenna transmission mode 116a belongs to the single antenna port mode 114a). When a wireless communication device 104 receives a PUSCH transmission mode RRC signal that indicates the transition to the single antenna transmission mode 116a during transmit diversity mode 116b, SU-MIMO mode (rank one) 116c or SU-MIMO mode (rank two) 116d, the wireless communication device 104 may transition from the multiple antenna port mode 114b to the single antenna port mode 114a for one or more physical channels.

Alternatively, the RRC signaling referred to in FIG. 6 might include the antenna port mode 114. When a wireless communication device 104 receives an indication that the antenna port mode 114 should be the single antenna port mode 114a, the wireless communication device 104 may transition to the single antenna port mode 114a for one or more physical channels.

Reference is now made to FIG. 7. The method 700 of FIG. 7 illustrates that a wireless communication device 104 may be configured from the single antenna port mode 114a to the multiple antenna port mode 114b via RRC signaling. More specifically, FIG. 7 illustrates that a wireless communication device 104 may receive 702 RRC signaling. In response to receiving 702 the RRC signaling, the wireless communication device 104 may transition 704 to the multiple antenna port mode 114b for one or more physical channels 108 (e.g., PUSCH 108, PUCCH 110, SRS 112). If the wireless communication device 104 transitions to the multiple antenna port mode 114b, the wireless communication device 104 may transmit the PUCCH 110 or the SRS 112 as shown in FIG. 4(a) or 5(a).

The RRC signaling referred to in FIG. 7 might include the transmission mode 116 for the PUSCH 108. An example will be described assuming that the wireless communication device 104 is configured according to case two 320 in FIG. 3. When a wireless communication device 104 receives a PUSCH transmission mode RRC signal that indicates the transition from the single antenna transmission mode 116a to the transmit diversity mode 116b, the SU-MIMO mode (rank one) 116c or the SU-MIMO mode (rank two) 116d, the wireless communication device 104 may transition from the single antenna port mode 114a to the multiple antenna port mode 114b for one or more physical channels (e.g., PUSCH 108, PUCCH 110, SRS 112).

Alternatively, the RRC signaling referred to in FIG. 7 might include the antenna port mode 114. When a wireless communication device 104 receives an indication that the antenna port mode 114 should be the multiple antenna port mode 114b, the wireless communication device 104 may transition to the multiple antenna port mode 114b for one or more physical channels (e.g., PUSCH 108, PUCCH 110, SRS 112).

Reference is now made to FIG. 8. The method 800 of FIG. 8 illustrates that a wireless communication device 104 may attempt to return to single antenna port mode 114a, after a defined time period (which is shown as T in FIG. 8). The time period may be known to both the wireless communication device 104 and the base station 102 via either higher layer signaling or as a class parameter for the wireless communication device 104.

More specifically, when the wireless communication device 104 receives 802 RRC signaling, the timer may be reset 804 and start to count. The wireless communication device 104 may transition 806 to the multiple antenna port mode 114b for one or more physical channels. When the wireless communication device 104 determines 808 that the timer has exceeded the defined time period (T), then the wireless communication device 104 autonomously returns 810 to the single antenna port mode 114a.

Figure 9:
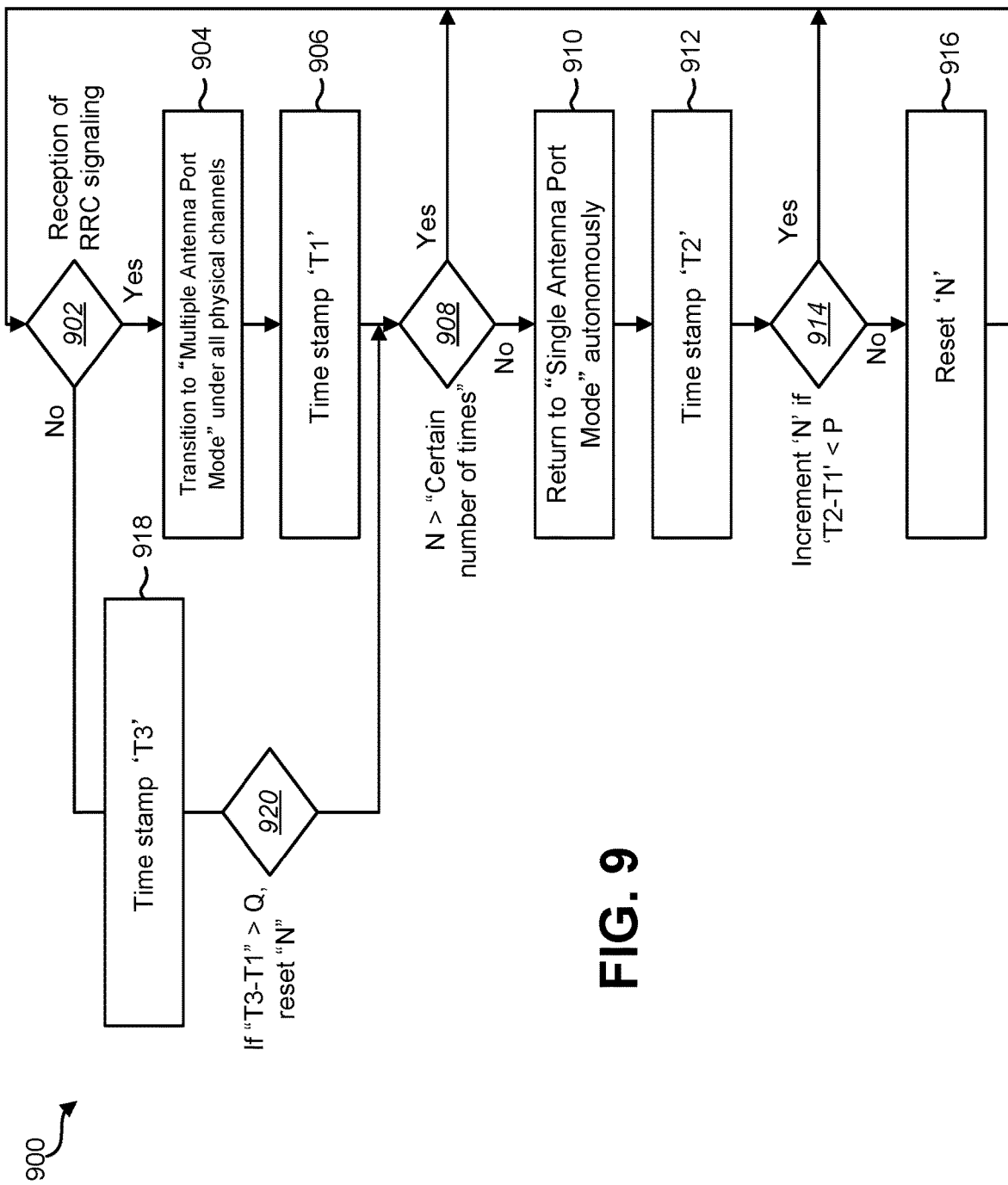
FIG. 9 illustrates a method whereby a wireless communication device may stop the autonomous transition to single antenna port mode under certain circumstances.

Reference is now made to FIG. 9. The method 900 of FIG. 9 illustrates how the wireless communication device 104 may stop the autonomous transition to the single antenna port mode 114a under certain circumstances. If the pattern of cycling between the base station's 102 instruction to transition to the multiple antenna port mode 114b and the wireless communication device 104 autonomously transitioning to the single antenna port mode 114a happens a certain number of times (which may be defined as a system parameter) during a certain time (which is shown as P in FIG. 9), then the wireless communication device 104 may cease to autonomously transition to the single antenna port mode 114a. The wireless communication device 104 may restart the autonomous transition to the single antenna port mode 114a after a certain time (which is shown as Q in FIG. 9).

More specifically, the wireless communication device 104 may determine 902 whether RRC signaling has been received. If it has, then the wireless communication device 104 may transition 904 to the multiple antenna port mode 114b for one or more physical channels. In addition, the wireless communication device 104 may create 906 a time stamp "T1". The wireless communication device 104 may then determine 908 whether N (which represents the number of times that the wireless communication device 104 has autonomously transitioned to the single antenna port mode 114a) exceeds a defined limit, which is shown as "certain number of times" in FIG. 9. If not, the wireless communication device 104 may autonomously return 910 to the single antenna port mode 114a. In addition, the wireless communication device 104 may determine 914 whether T2−T1<P (where P represents a defined time period, as described above). If not, then the value of N may be reset 916, and the method 900 may return to step 902 and continue as described above.

If in step 908 it is determined that N does exceed the defined limit, then the method may return to step 902 (without returning 910 to the single antenna port mode 114a) and continue as described above. If in step 914 it is determined that T2−T1 is less than P, then the method 900 may return to step 902 (without resetting 914 N) and continue as described above. If in step 902 it is determined that RRC signaling has not been received, then the wireless communication device 104 may create 918 a time stamp "T3". The value of N may be reset 920 if T3−T1>Q (where Q represents a defined time period, as described above). The method 900 may then proceed to step 908, and continue as described above.

The base station 102 may detect the wireless communication device's 104 autonomous transition from the multiple antenna port mode 114b to the single antenna port mode 114a. For example, suppose that the base station 102 allocates multiple (e.g., two or four) codes 422 for the wireless communication device 104 in the multiple antenna port mode 114b. If the base station 102 detects that the SRS 112 was sent out on only one code 422a (as shown in FIG. 4(b)) even though the information at the base station 102 indicates that the wireless communication device 104 is in multiple antenna port mode 114b, the base station 102 may consider that the wireless communication device 104 has autonomously transitioned from the multiple antenna port mode 114b to the single antenna port mode 114a.

As another example, suppose that the base station 102 allocates multiple (e.g., two) RBs 524 for the wireless communication device 104 in the multiple antenna port mode 114b. If the base station 102 detects that the wireless communication device 104 is using only one RB 524a for PUCCH 110 (as shown in FIG. 5(b)) even though the information at the base station 102 indicates that the wireless communication device 104 is in multiple antenna port mode 114b, the base station 102 may consider that the wireless communication device 104 has autonomously transitioned from the multiple antenna port mode 114b to the single antenna port mode 114a.

Figures 10, 11:
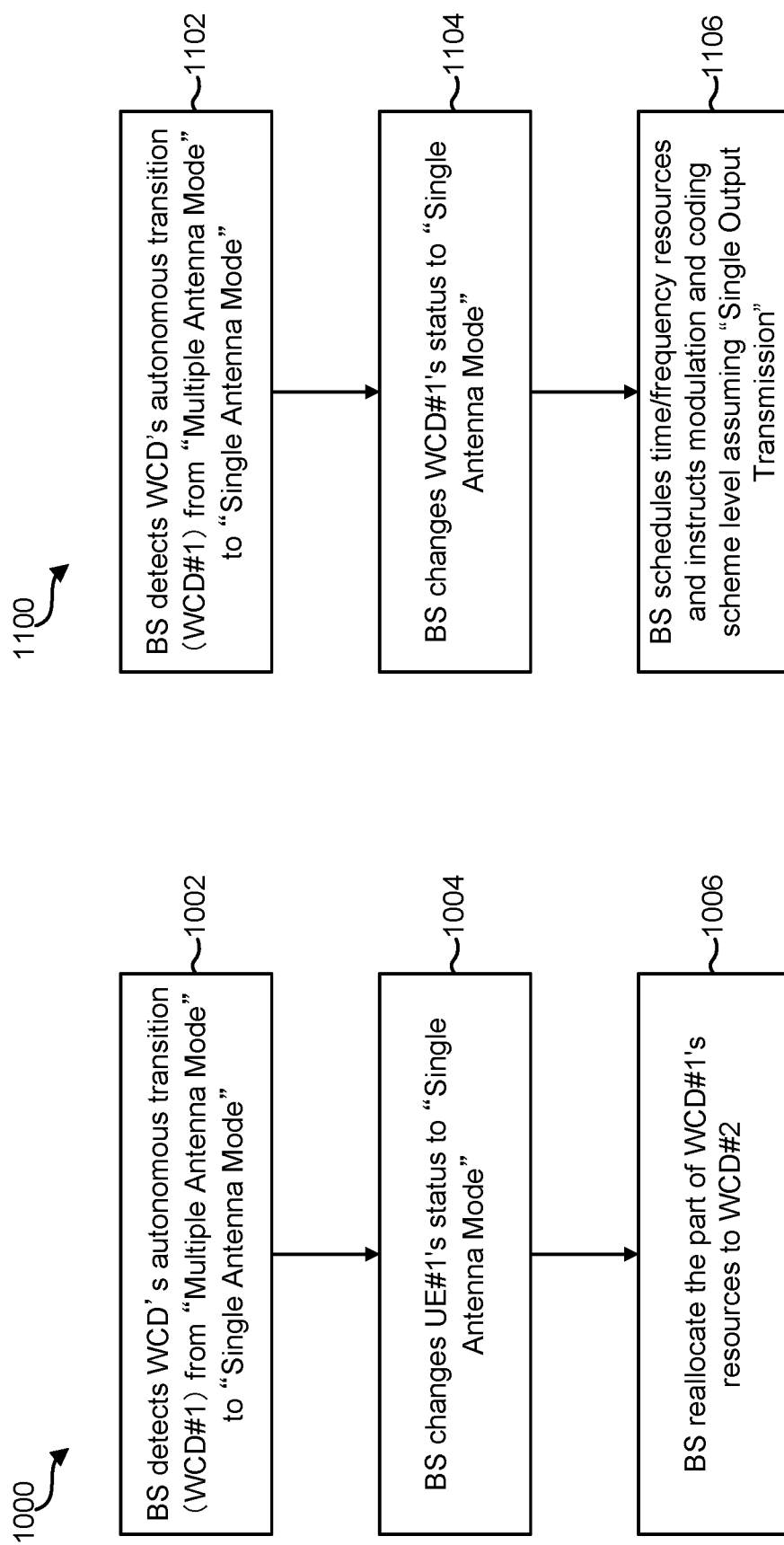
FIG. 10 illustrates a method whereby a base station may reallocate resources after it detects that a wireless communication device has autonomously transitioned from multiple antenna port mode to single antenna port mode.
FIG. 11 illustrates a method whereby a base station may schedule time/frequency resources and instruct modulation and coding scheme levels after it detects that a wireless communication device has autonomously transitioned from multiple antenna port mode to single antenna port mode.

Reference is now made to FIG. 10. The method 1000 of FIG. 10 illustrates that once the base station 102 detects 1002 that a first wireless communication device 104 has autonomously transitioned from the multiple antenna port mode 114b to the single antenna port mode 114a, the base station 102 may change 1004 the first wireless communication device's 104 status to single antenna port mode 114a and reallocate 1006 the part of the resources that are no longer being used by the first wireless communication device 104 to a second wireless communication device 104. For example, code #2 422b in FIG. 4 and/or RB #2 524b in FIG. 5 for the first wireless communication device 104 may be reallocated to the second wireless communication device 104 without any signaling to the first wireless communication device 104.

Reference is now made to FIG. 11. The method 1100 of FIG. 11 illustrates that once the base station 102 detects 1102 that a first wireless communication device 104 has autonomously transitioned from multiple antenna port mode 114b to single antenna port mode 114a, the base station 102 may change 1104 the status of the first wireless communication device 104 to single antenna port mode 114a. The base station 102 may schedule 1106 time/frequency resources and instruct modulation and coding scheme levels assuming that single input single output transmission (which implied by single antenna port mode 114a) were to be executed by the wireless communication device 104, unless and until the base station 102 determines to change the wireless communication device's 104 antenna port mode 114 from single 114a to multiple 114b, for objectives determined by its scheduling algorithm (e.g., revenue, capacity, optimization or other such measures).

The base station 102 may configure the wireless communication device 104 to transition from multiple antenna port mode 114b to single antenna port mode 114a via RRC signaling. The RRC signaling might include the PUSCH transmission mode. For example, referring to the method 1200 shown in FIG. 12, the base station 102 may inform 1202 a first wireless communication device 104 to transition to single antenna transmission mode 116a by using the PUSCH transmission mode parameter in RRC signaling. Then, the base station 102 may change 1204 the first wireless communication device's 104 status to single antenna port mode 114a and reallocate 1206 the part of resources that are no longer being used by the first wireless communication device 104 to a second wireless communication device 104.

Alternatively, referring to the method 1300 shown in FIG. 13, an explicit antenna port mode parameter may be configured via RRC signaling. The base station 102 may change 1302 the status of the first wireless communication device 104 to single antenna port mode 114a. The base station 102 may also configure 1304 the first wireless communication device's 104 antenna port mode 114 to single antenna port mode 114a by using an antenna port parameter via RRC signaling. Once the base station changes 1302 the first wireless communication device's 104 status, the base station 102 may reallocate 1306 the part of the resources that are no longer being used by the first wireless communication device 104 to a second wireless communication device 104.

The base station 102 may configure the wireless communication device 104 to transition from single antenna port mode 114a to multiple antenna port mode 114b via RRC signaling. For example, assuming case two 320 as illustrated in FIG. 3, the base station 102 may inform the wireless communication device 104 to transition to transmit diversity mode 116b or SU-MIMO mode (rank one) 116c by using a PUSCH transmission mode parameter in RRC signaling.

Referring to the method 1400 illustrated in FIG. 14, the base station 102 may reallocate 1402 a second wireless communication device's 104 resources to a first wireless communication device 104. For example, code #2 422b in FIG. 4 and/or RB #2 524b in FIG. 5 may be reallocated 1402 to the first wireless communication device 104. Then, the base station 102 may change 1404 the status of the first wireless communication device 104 to multiple antenna port mode 114b, and the base station 102 may instruct 1406 the wireless communication device 104 to transition to transmit diversity mode 116b or SU-MIMO mode (rank one) 116c by using a PUSCH transmission mode parameter in RRC signaling.

Alternatively, assuming case one 218 as illustrated in FIG. 2 (where transmit diversity mode 116b and SU-MIMO mode (rank one) 116c belong to both multiple antenna port mode 114b and single antenna port mode 114a), an explicit antenna port mode parameter may be configured via RRC signaling. Referring to the method 1500 illustrated in FIG. 15, the base station 102 may reallocate 1502 a second wireless communication device's 104 resources to a first wireless communication device 104. For example, code #2 422b in FIG. 4 and/or RB #2 524b in FIG. 5 may be reallocated 1502 to the first wireless communication device 104. Then, the base station 102 may change 1504 the status of the first wireless communication device 104 to multiple antenna port mode 114b, and the base station 102 may instruct 1506 the first wireless communication device 104 to transition to multiple antenna port mode 114b by using the antenna port mode parameter in RRC signaling.

In the cases where the wireless communication device 104 returns to a single antenna port mode 114a following instruction from the base station 102 to transition to multiple antenna port mode 114b, the base station 102 may schedule time/frequency resources and instruct modulation and coding scheme levels assuming single input single output transmission were to be executed by the wireless communication device 104. This may continue until the base station 102 determines to change the wireless communication device's 104 antenna port mode 114 from single 114a to multiple 114b, at which point the base station 102 may re-send an RRC command to re-establish multiple antenna port mode 114b.

Referring to the method 1600 illustrated in FIG. 16, the base station 102 may reallocate 1602 resources from a second wireless communication device 104 to a first wireless communication device 104. Then, the base station 102 may change 1604 the status of the first wireless communication device 104 to multiple antenna port mode 114b, and the base station 102 may instruct 1606 the first wireless communication device 104 to transition to multiple antenna port mode 114b by using the antenna port mode parameter in RRC signaling. When the wireless communication device's 104 autonomous transition to single antenna port mode 114a is detected 1608, the method 1600 may return to step 1604 and continue as described above.

Figure 17:
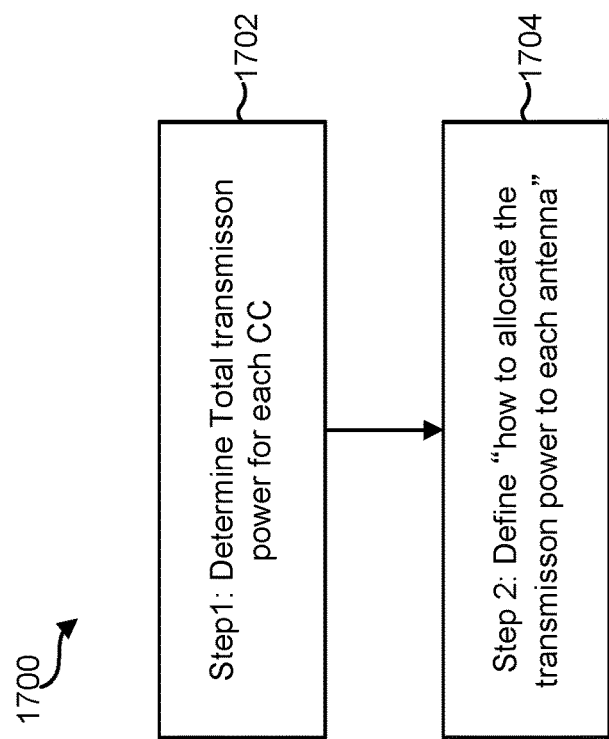
FIG. 17 illustrates an uplink power control procedure.

Another aspect of the systems and methods disclosed herein relates to uplink transmit power control for supporting multiple antenna transmission modes and multiple physical channels. Referring to the method 1700 illustrated in FIG. 17, an uplink power control procedure may include two steps. The first step is defining 1702 the total transmission power for each component carrier (CC). The second step is defining 1704 how to allocate the transmission power to each antenna 106. The wireless communication device 104 may perform both the first step 1702 and the second step 1704. The base station 102 may only perform the first step 1702. The second step 1704—allocation of transmission power to each antenna 106—may be different depending on whether the wireless communication device 104 is in the single antenna port mode 114a or the multiple antenna port mode 114b, and it may depend on the power amplifier (PA) configuration.

Figure 18:
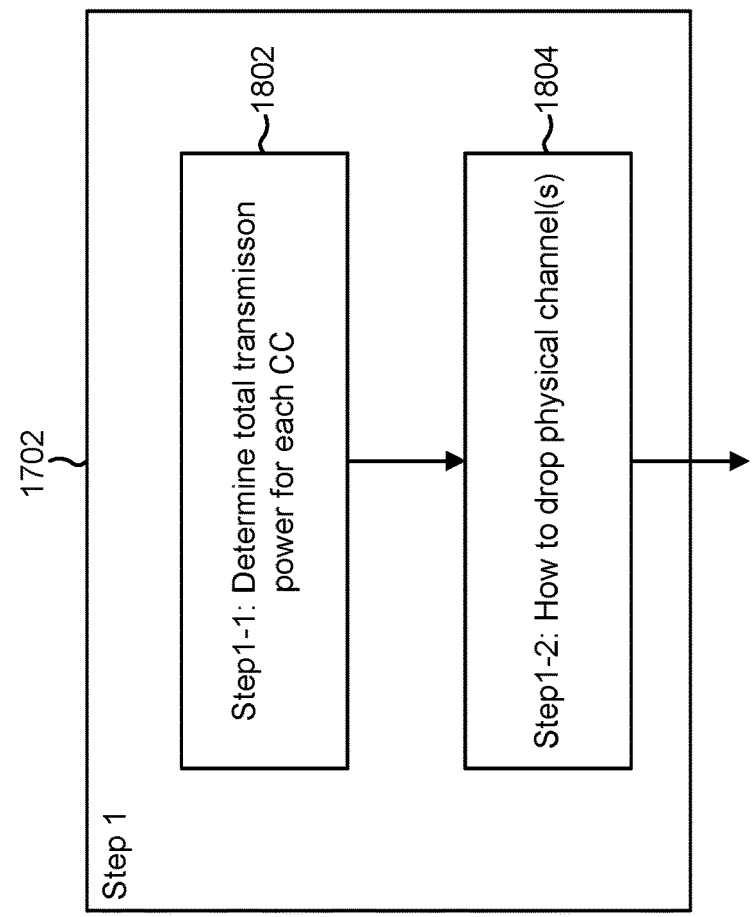
FIG. 18 illustrates additional details about one aspect of the uplink power control procedure illustrated in FIG. 17.

FIG. 18 illustrates the details of step one 1702 (i.e., defining the total transmission power for each CC). As shown in FIG. 18, step one 1702 may include two sub-steps 1802, 1804. The first sub-step 1802 is to determine the total transmission power for each CC. The second sub-step 1804 is to determine whether to drop any physical channel(s). In some cases, the second sub-step 1804 may be skipped.

The details of the first sub-step 1802 depend on the physical channel. For PUSCH 108, the transmission power for each CC may be defined by equation (1):

$$P_{PUSCH}(i,k) = \min \begin{Bmatrix} P_{MAX}, 10 \cdot \log_{10} M_{PUSCH}(i,k) + \\ P_{0\_PUSCH}(k) + \alpha(k) \cdot PL(k) + \\ \Delta_{TF}(i,k) + f(i,k) \end{Bmatrix} \quad (1)$$

Equation (1) is expressed in units of dBm. In equation (1), k is the uplink CC number, and i is the subframe number. $P_{MAX}$ is the total maximum allowed power. $M_{PUSCH}(i,k)$ is the number of, contiguous or non-contiguous, PRBs in UL CC k. $P_{0\_PUSCH}(k)$ is the sum of cell-specific ($P_{O\_NOMINAL\_PUSCH}(k)$) and wireless communication device-specific ($P_{O\_UE\_PUSCH}(k)$) components. $\alpha(k)$ is the fractional TPC cell-specific parameter for UL CC k with $0 \leq \alpha(k) \leq 1$. PL(k) is the downlink path-loss estimate for downlink CC k. The expression $\Delta_{TF}(i,k)=10 \cdot \log_{10}(2^{K_s(k) \cdot TBS(i,k)/N_{RE}(i,k)}-1)$ where $K_s(k)=0$ or 1.25, TBS(i,k) is the TB size, and $N_{RE}(i,k)= M_{PUSCH}(i,k) \cdot N_{sc}^{RB} \cdot N_{sc}^{RB} \cdot N_{symb}^{PUSCH}(i,k)$. The expression $f(i,k)=f(i-1,k)+\delta_{PUSCH}(i,k)$ is the function accumulating the CL TPC command $\delta_{PUSCH}(i,k)$ during sub-frame i with f(0,k) being the first value after reset of accumulation.

For PUCCH 110, the transmission power for each CC may be defined by equation (2):

$$P_{PUCCH}(i,k) = \min \begin{Bmatrix} P_{MAX}, 10 \cdot \log_{10} M_{PUCCH}(i,k) + \\ P_{0\_PUCCH}(k) + PL(k) + \\ h(\cdot) + \Delta_{F\_PUCCH}(F) + g(i,k) \end{Bmatrix} \quad (2)$$

Equation (2) is expressed in units of dBm. In equation (2), k is the uplink CC number, and i is the subframe number. $M_{PUCCH}(i,k)$ is the number of orthogonal resources allocated for PUCCH in UL CC k. $P_{0\_PUCCH}(k)$ is the sum of cell-specific ($P_{O\_NOMINAL\_PUCCH}(k)$) and wireless communication device-specific ($P_{O\_UE\_PUCCH}(k)$) components. PL(k) is the estimated path loss in UL k. The expression h(•) is a PUCCH format dependent value. The expression $\Delta_{F\_PUCCH}(F)$ corresponds to PUCCH format (F), relative to format 1a. The expression g(i,k) is the function accumulating the CL TPC commands in CC k.

The orthogonal resources for PUCCH may mean orthogonal code and frequency resources which are allocated for a specific wireless communication device. Orthogonal codes include Zadoff-Chu sequences and orthogonal covering (e.g., Walsh code). Frequency resources means Resource Blocks, in the parlance of 3GPP LTE Release 8. Therefore, if two different Zadoff-Chu sequences and the same RB were allocated for a wireless communication device, it may be said that two orthogonal resources are allocated for the wireless communication device. If the same Zadoff-Chu sequence and two different RBs were allocated for a wireless communication device, it may be said that two orthogonal resources are allocated for the wireless communication device.

In another example, for PUCCH 110, the transmission power for each CC may be defined by equation (2-1):

$$P_{PUCCH}(i, k) = \min\left\{ \begin{array}{l} P_{MAX}, P_{0\_PUCCH}(k) + PL(k) + \\ h(\cdot) + \Delta_{F\_PUCCH}(F) + g(i, k) \end{array} \right\} \quad (2\text{-}1)$$

Equation (2-1) is expressed in units of dBm. In equation (2), k is the uplink CC number, and i is the subframe number. $P_{0\_PUSCH}(k)$ is the sum of cell-specific ($P_{O\_NOMINAL\_PUCCH}(k)$) and wireless communication device-specific ($P_{O\_UE\_PUCCH}(k)$) components. PL(k) is the estimated path loss in UL k. The expression h(•) is a PUCCH format dependent value. The expression $\Delta_{F\_PUCCH}(F)$ corresponds to PUCCH format (F), relative to format 1a. The expression g(i,k) is the function accumulating the CL TPC commands in CC k.

For SRS 112, the transmission power for each CC may be defined by equation (3):

$$P_{SRS}(i, k) = \min\left\{ \begin{array}{l} P_{MAX}, P_{SRS\_OFFSET}(k) + \\ 10 \cdot \log_{10} M_{SRS}(k) + P_{0\_PUSCH}(k) + \\ \alpha(k) \cdot PL(k) + f(i, k) \end{array} \right\} \quad (3)$$

Equation (3) is expressed in units of dBm. In equation (3), k is the uplink CC number, and i is the subframe number. $P_{SRS\_OFFSET}(k)$ is a wireless communication device-specific parameter. $M_{SRS}(k)$ is the SRS transmission bandwidth, in PRBs, in uplink CC k. The remaining parameters are as defined for PUSCH transmission in UL CC k.

Figure 19:
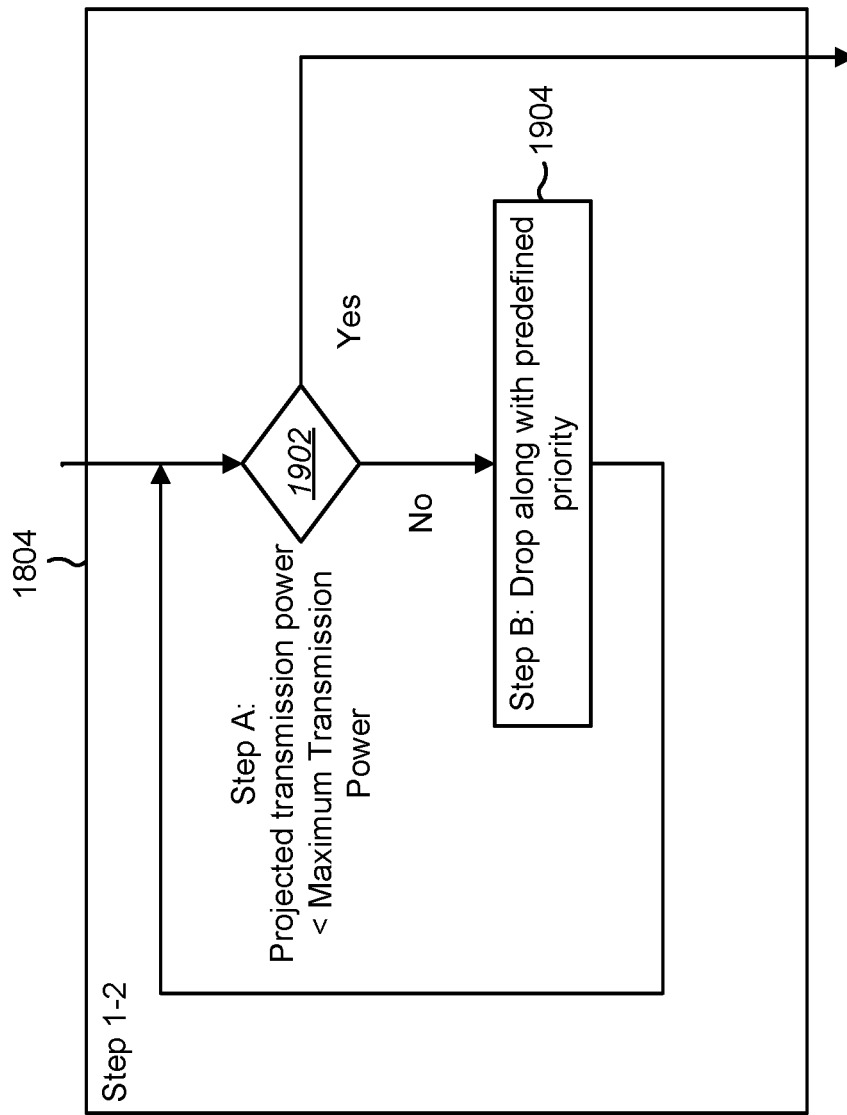
FIG. 19 illustrates additional details about another aspect of the uplink power control procedure illustrated in FIG. 17.

Referring to FIG. 19, the details of the second sub-step 1804 (i.e., determining how to drop physical channel(s)) are illustrated. The projected transmission power and the maximum transmission power may be compared 1902. If the projected transmission power is smaller than the maximum transmission power, then the method may proceed to step two 1704. Otherwise, the physical channel is dropped 1904 based on the predefined priority. Then the method returns to comparing 1902 the projected transmission power and the maximum transmission power.

For purposes of comparing 1902 the projected transmission power and the maximum transmission power, the definition of "projected transmission power" may be as follows.

$$\text{Projectedtransmissionpower}(i, n_{ns}, l) = \quad (4)$$
$$\sum_k \{n_{PUSCH}(i, n_{ns}, l, k) \cdot P_{PUSCH}(i, k) +$$
$$n_{PUCCH}(i, n_{ns}, l, k) \cdot P_{PUCCH}(i, k) n_{SRS}(i, n_{ns}, l, k) \cdot P_{SRS}(i, k)\}$$

The maximum transmission power may be defined by the total transmission power. The maximum transmission power may be defined by the power class of the wireless communication device 104 (which may be constrained by government regulations). For example, the maximum transmission power may be 23 dBm, 21 dBm, 25 dBm, etc.

In equation (4), $n_{PUSCH}$, $n_{PUCCH}$ and $n_{SRS}$ stand for the following. The expression $n_{PUSCH}(i,n_{ns},l,k)=1$ if PUSCH 108 is allocated on a specific symbol (on ith subframe, $n_{ns}$ slot, lth symbol and kth component carrier). The expression $n_{PUSCH}(i,n_{ns},l,k)=0$ if PUSCH 108 is not allocated on a specific symbol (on ith subframe, $n_{ns}$ slot, lth symbol and kth component carrier). The expression $n_{PUCCH}(i,n_{ns},l,k)=1$ if PUCCH 110 is allocated on a specific symbol (on ith subframe, $n_{ns}$ slot, lth symbol and kth component carrier). The expression $n_{PUCCH}(i,n_{ns},l,k)=0$ if PUCCH 110 is not allocated on a specific symbol (on ith subframe, $n_{ns}$ slot, lth symbol and kth component carrier). The expression $n_{PUSCH}(i,n_{ns},l,k)=1$ if SRS 112 is allocated on a specific symbol (on ith subframe, $n_{ns}$ slot, lth symbol and kth component carrier). The expression $n_{PUSCH}(i,n_{ns},l,k)=0$ if SRS 112 is not allocated on a specific symbol (on ith subframe, $n_{ns}$ slot, lth symbol and kth component carrier).

Figure 20:
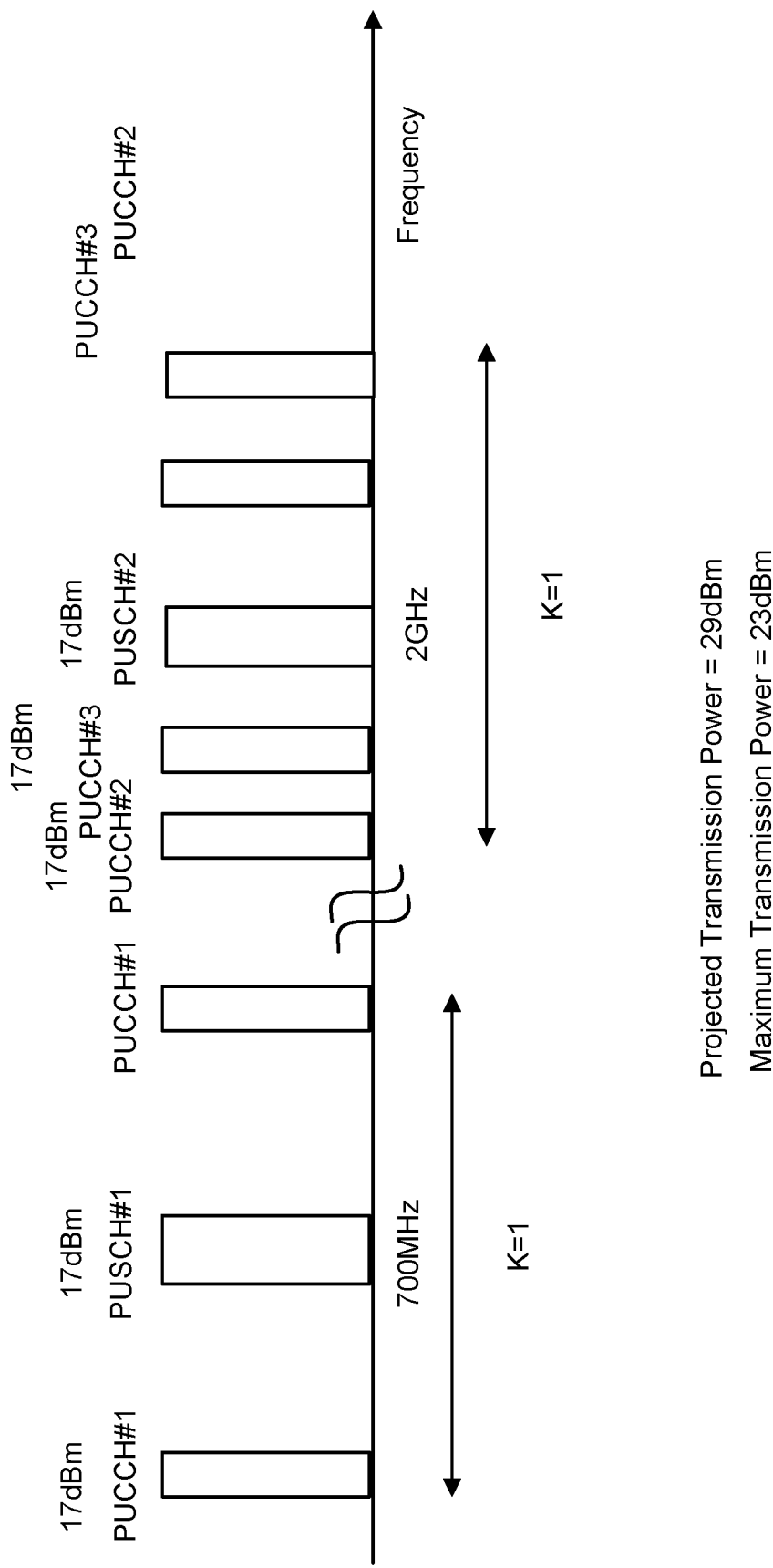
FIG. 20 illustrates an example of transmission power allocation before the step of determining whether to drop physical channels is performed.
Figure 21:
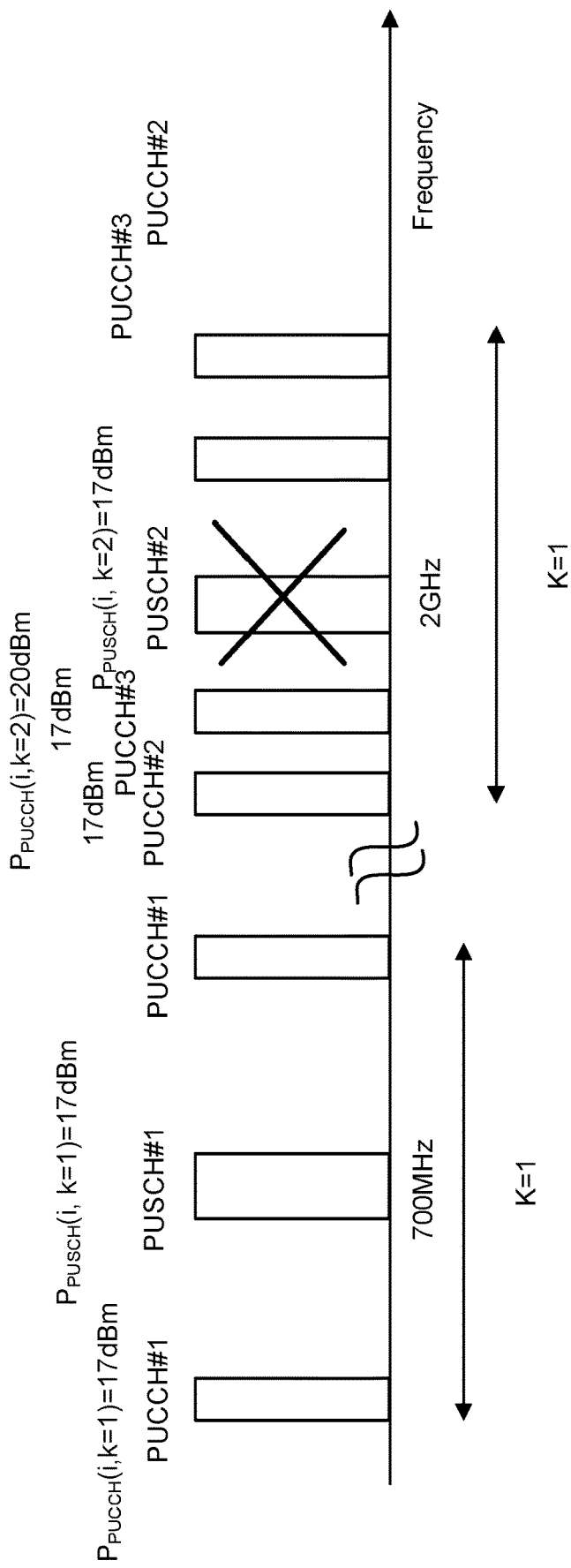
FIG. 21 illustrates an example of transmission power allocation after the step of determining whether to drop physical channels is performed.

The predefined order of the physical channel priority may be as follows. In general, the order could be any permutation of the physical channels or as determined by base station scheduling and control. In one example, PUCCH low frequency>>>PUCCH high frequency>PUSCH low frequency>>PUSCH high frequency. In another example, PUCCH low frequency>>PUSCH low frequency>>PUCCH high frequency>>PUSCH high frequency In another example, PUCCH low frequency>>>PUCCH high frequency>SRS low frequency>>SRS high frequency. In another example, PUCCH low frequency>>>PUCCH high frequency>SRS low frequency>>SRS high frequency>>>PUSCH low frequency>>PUSCH high frequency. In another example, SRS low frequency<<PUCCH low frequency<<PUSCH low frequency<<SRS high frequency<<PUCCH high frequency<<PUSCH low frequency>>PUSCH high frequency. Based on this order, some physical channels may be dropped until the projected transmission power becomes less than the maximum transmission power. One example is shown in FIGS. 20 and 21. FIG. 20 illustrates the transmission power allocation before the step of determining 1804 whether to drop physical channels is performed. FIG. 21 illustrates the transmission power allocation after this step 1804 is performed.

If the uplink power control procedure described above is applied, the base station 102 can ignore the power amplifier (PA) configuration of the wireless communication device 104 for purposes of power control, even though each wireless communication device 104 may have a different PA configuration. In other words, power control can be independently of the PA configuration. Therefore, less signaling is required in the transition between single antenna port mode 114a and multiple antenna port mode 114b. Also, since there is a common power control equation between single antenna port mode 114a and multiple antenna port mode 114b, there may not be a rapid power change between them.

A wireless communication device may have both step one 1702 and step two 1704 in its uplink power control procedure. The base station 102 may have only step one 1702 in its uplink power control procedure. The base station 102 can ignore the PA configuration and the antenna port mode 114 of the wireless communication device 104 in its uplink power control procedure.

Figure 22:
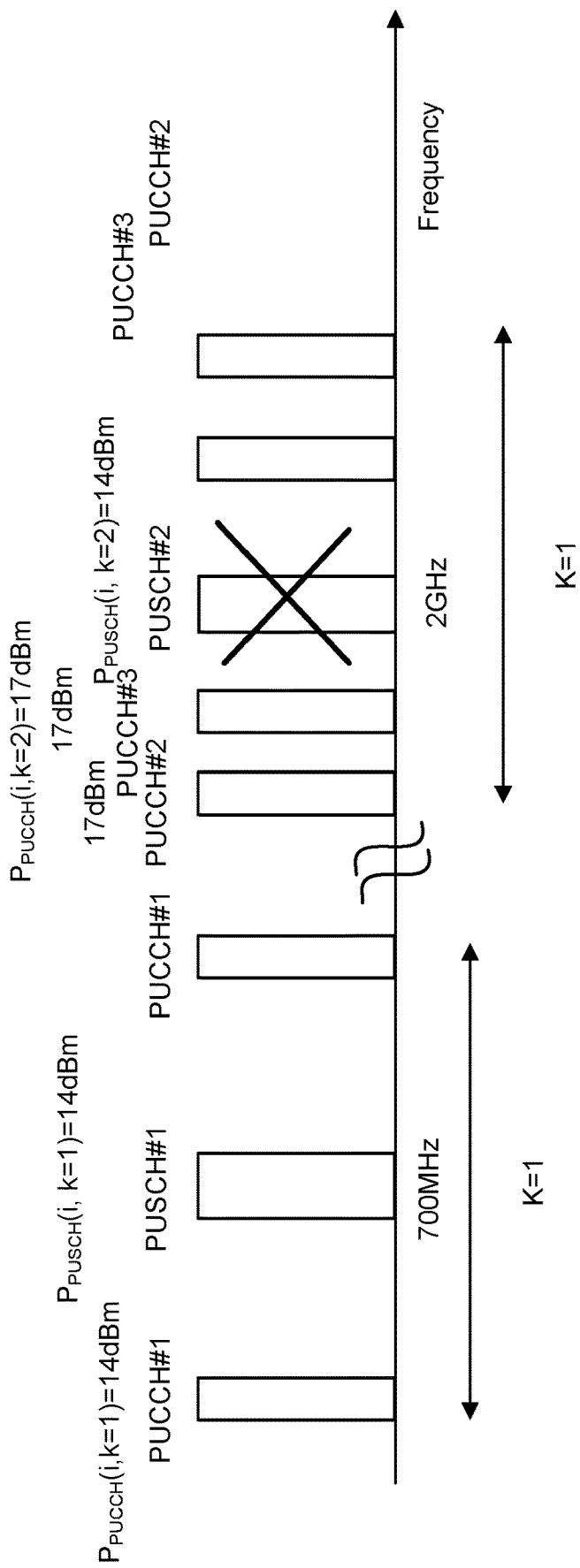
FIG. 22 illustrates an example of transmission power allocation for the two 20 dBm power amplifier configuration case.
Figure 23:
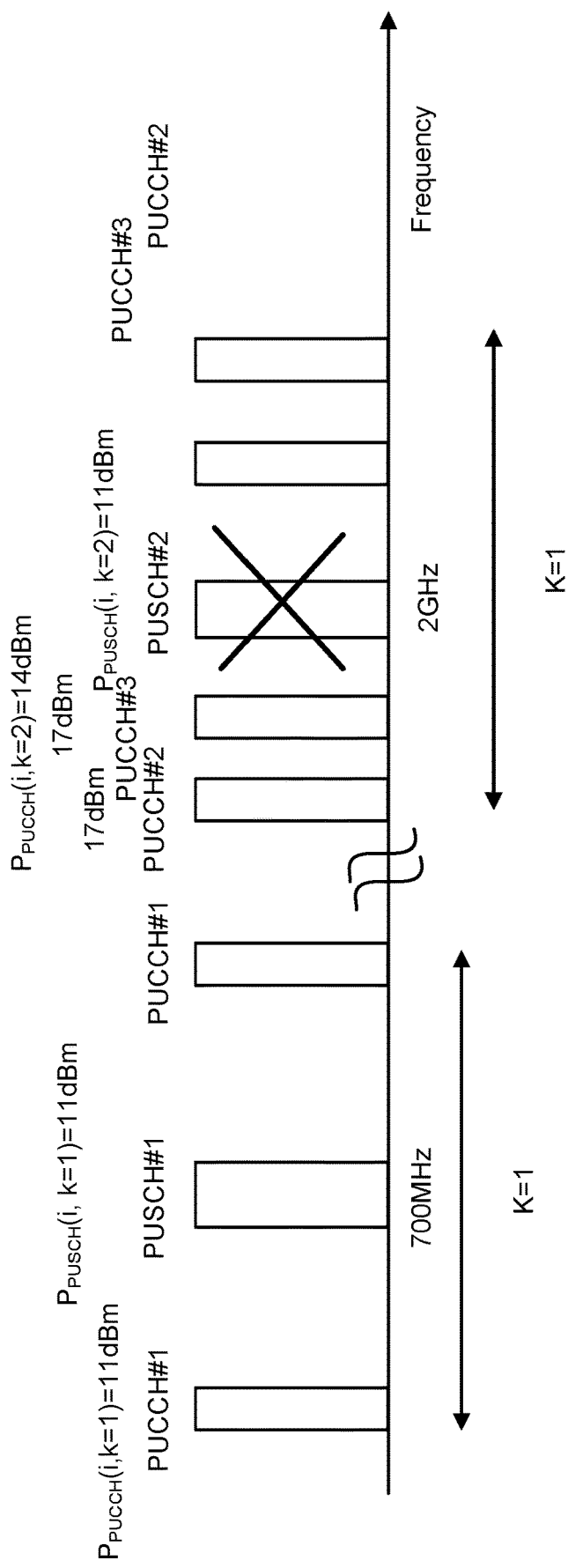
FIG. 23 illustrates an example of transmission power allocation for the four 17 dBm PA configuration case.

In single antenna port mode 114a, depending on the PA configuration, allocation of transmission power is different between the antennas 106a, 106b. For example, in the two or four 23 dBm PA configuration case, single antenna port mode 114a may use only one PA physically. In other words, the same transmission power as shown in FIG. 21 for one antenna 106a will be allocated. For the remaining antenna 106b, no power will be allocated. In the two 20 dBm PA configuration case, single antenna port mode 114a may use two PAs physically and the allocated transmission power for each antenna 106a, 106b may be as shown in FIG. 22. In the four 17 dBm PA configuration case, the single antenna port mode 114a may use two PAs physically and the allocated transmission power for each antenna 106 may be as shown in FIG. 23. In multiple antenna port mode 114b, for the two antenna 106a, 106b case, one-half of the transmission power may be allocated to each antenna 106, as shown in FIG. 22. One-quarter of the transmission power may be allocated to each antenna 106 in the four antenna 106 case, as shown in FIG. 23.

In SU-MIMO (rank one) mode 116c, a wireless communication device 104 may use only one antenna 106 physically. It may be said that an antenna turn-off vector is used. When an antenna turn-off vector is used, a wireless communication device 104 is assumed to be in the single antenna port mode 114a. In other words, the same transmission power as shown in FIG. 21 for one antenna 106a will be allocated. For the remaining antenna 106b, no power will be allocated.

At least some aspects of the present disclosure relate to a transmission diversity implementation allowing both single and multiple antenna transmission schemes. The PUSCH transmission diversity scheme may include two steps: the first step is an open-loop transmission diversity scheme, and the second step is an antenna port weighting process. The open-loop transmission diversity scheme may be SFBC (space-frequency block coding), STBC (space-time block coding), FSTD (frequency selective transmission diversity), or CDD (cyclic delay diversity).

Figure 24:
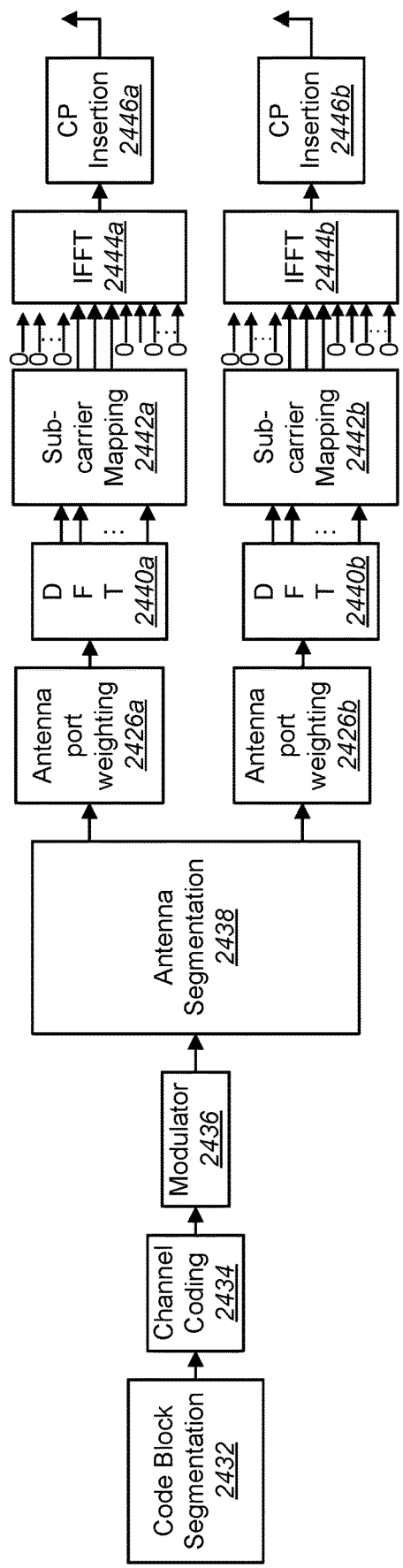
FIG. 24 illustrates an open-loop transmission diversity scheme implemented as frequency selective transmission diversity (FSTD)

After the open-loop transmission diversity process, there may be an antenna port weighting process. Assuming that SC-FDMA (single carrier-frequency diversity multiple access) is used, there may be a discrete Fourier transform (DFT), an inverse fast Fourier transform (IFFT), and a CP insertion process after the open-loop transmission diversity process and the antenna port weighting process. This is the case for FSTD, as shown in FIG. 24, and for CDD, as shown in FIG. 26. Alternatively, there may be an IFFT and CP insertion process after the open-loop transmission diversity process and the antenna port weighting process. This is the case for SFBC, as shown in FIG. 25.

FIG. 24 illustrates the open-loop transmission diversity scheme implemented as FSTD. The FSTD open-loop transmission diversity scheme includes a code block segmentation module 2432, a channel coding module 2434, a modulator module 2436, and an antenna segmentation module 2438. The antenna segmentation module 2438 has two outputs. The first output of the antenna segmentation module 2438 is processed by a first antenna port weighting module 2426a, a first discrete Fourier transform (DFT) module 2440a, a first subcarrier mapping module 2442a, a first inverse fast Fourier transform (IFFT) module 2444a, and a first cyclic prefix (CP) insertion module 2446a. The second output of the antenna segmentation module 2438 is processed by a second antenna port weighting module 2426b, a second DFT module 2440b, a second subcarrier mapping module 2442b, a second IFFT module 2444b, and a second CP insertion module 2446b.

Figure 25:
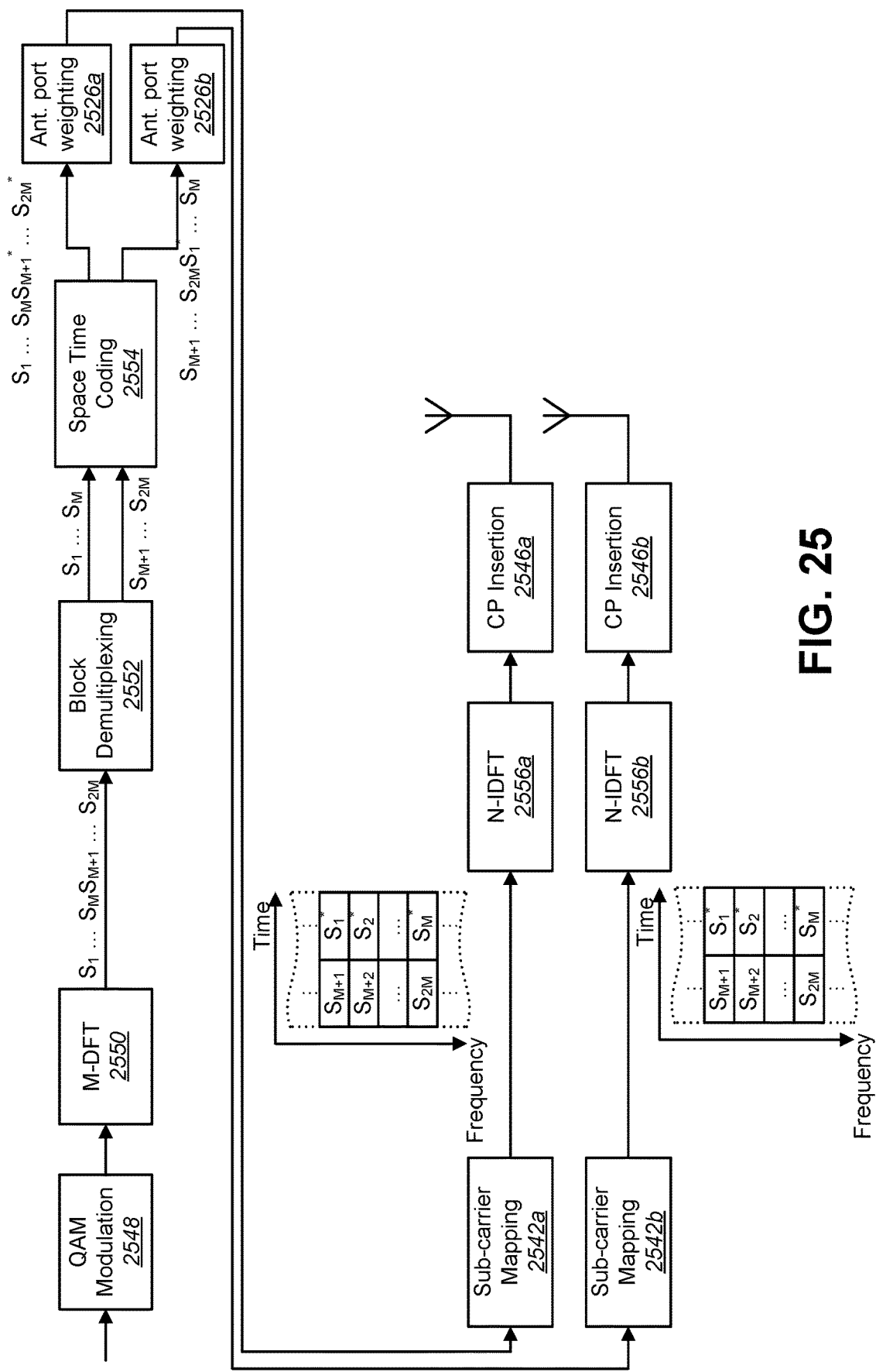
FIG. 25 illustrates an open-loop transmission diversity scheme implemented as space-frequency block coding (SFBC)
Figure 26:
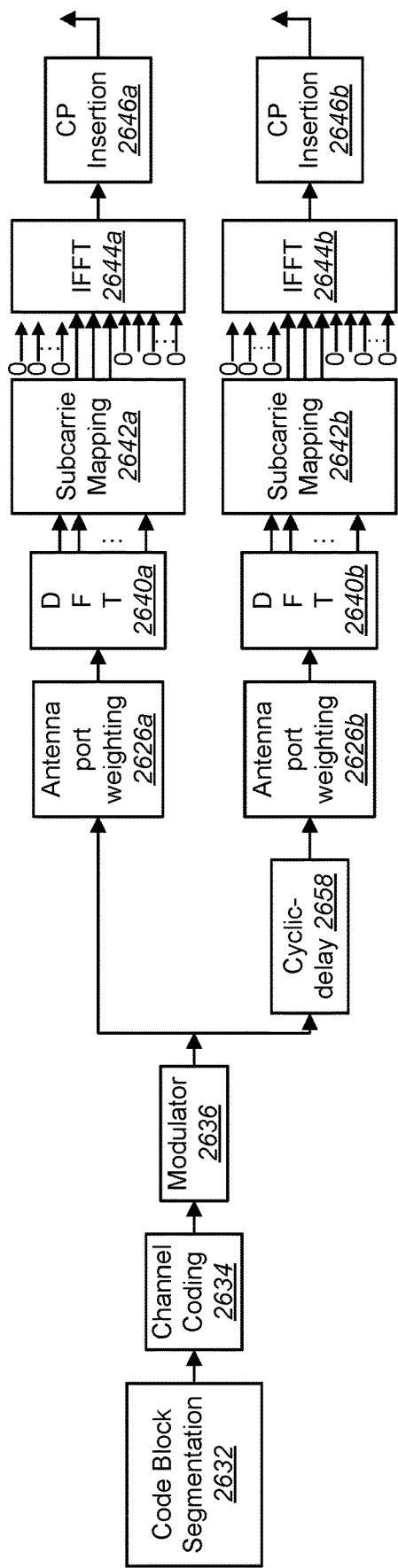
FIG. 26 illustrates an open-loop transmission diversity scheme implemented as cyclic delay diversity (CDD)

FIG. 25 illustrates the open-loop transmission diversity scheme implemented as SFBC. The SFBC open-loop transmission diversity scheme includes a quadrature amplitude modulation (QAM) module 2548, an M-DFT module 2550, a block demultiplexing module 2552, and a space-time coding module 2554. The space-time coding module 2554 has two outputs. The first output of the space-time coding module 2554 is processed by a first antenna port weighting module 2526a, a first sub-carrier mapping module 2542a, a first N-IDFT (inverse discrete Fourier transform) module 2556a, and a first CP insertion module 2546a. The second output of the space-time coding module 2554 is processed by a second antenna port weighting module 2526b, a second sub-carrier mapping module 2542b, a second N-IDFT module 2556b, and a second CP insertion module 2546b.

FIG. 26 illustrates the open-loop transmission diversity scheme implemented as CDD. The CDD open-loop transmission diversity scheme includes a code block segmentation module 2632, a channel coding module 2634, and a modulator module 2636. The modulator module 2636 has two outputs. The first output of the modulator module 2636 is processed by a first antenna port weighting module 2626a, a first DFT module 2640a, a first subcarrier mapping module 2642a, a first IFFT module 2644a, and a first CP insertion module 2646a. The second output of the modulator module 2636 is processed by a cyclic delay module 2658, a second antenna port weighting module 2626b, a second DFT module 2640b, a second subcarrier mapping module 2642b, a second IFFT module 2644b, and a second CP insertion module 2646b.

As shown in FIG. 27A, an antenna port weighting process 2726a may multiply the input signal by x. Alternatively, as shown in FIG. 27B, an antenna port weighting process 2726b may multiply the input signal by $\sqrt{1-x^2}$. In either case, x may be any of the following: x={1,sqrt(½), 0}; x={1, sqrt(⅓),sqrt(½), sqrt(⅔),0}; or x={1, sqrt(⅙), sqrt(⅓), sqrt(½), sqrt(⅔), sqrt(⅚), 0}. Either of the antenna port weighting processes 2726a, 2726b in FIGS. 27A and 27B may be utilized as the antenna port weighting modules 2426a, 2426b, 2526a, 2526b, 2626a, 2626b in FIGS. 24-26. Antenna port weighting may be applied to both data and the demodulation reference signal (DMRS). In the case of two uplink transmit antennas 106a, 106b, when x=0 or 1, this implies that it is effectively a single antenna 106 transmission.

A wireless communication device 104 may be configured so that it always uses two antennas 106a, 106b when it is in transmit diversity mode 116b. For example, in case two 320 (FIG. 3), transmit diversity mode 116b belongs to multiple antenna port mode 114b only. However, a large antenna gain imbalance may degrade transmission diversity performance. Moreover, transmit diversity mode 116b may make battery life shorter. Hence, it may be beneficial for a wireless communication device 104 to transition from the multiple antenna port mode 114b to the single antenna port mode 114a when it is in the transmit diversity mode 116b.

At least some aspects of the systems and methods disclosed herein relate to switching between single antenna port mode 114a and multiple antenna port mode 114b when using transmit diversity mode 116b. There are at least three different mechanisms by which this can occur. First, the wireless communication device 104 can autonomously select the value of x (i.e., without any explicit or implicit signaling from the base station 102 to the wireless communication device 104). Second, the base station 102 may configure x via PDCCH (physical downlink control channel) signaling. Third, the wireless communication device 104 may overwrite the x value that was configured by the base station 102. Allowing the flexibility to transition between single antenna port mode 114a and multiple antenna port mode 114b in transmit diversity mode 116b may improve performance under a large antenna gain imbalance and may also save power and hence, may improve the battery performance.

The first mechanism mentioned above is that the wireless communication device 104 may autonomously select the value of x during transmit diversity mode 116b. In other words, without any explicit or implicit signaling from the base station 102 to the wireless communication device 104, the wireless communication device 104 may change the value of x. By applying an antenna port weighting process 2726 on both data and DMRS, the base station 102 reception process can be made transparent of the x value used at the wireless communication device 104. Hence, the wireless communication device 104 can autonomously select the value of x. Moreover, if there is large antenna gain imbalance between antennas 106a, 106b, this proposed scheme may have performance gain since one can use all transmission power on one antenna 106a if the other antenna's 106b gain is too small. Alternatively, when the wireless communication device's 104 battery level is low, one can make battery life longer by using only one antenna 106a, i.e., setting the value of x to 1. However, both antenna 106 gain imbalance and wireless communication device 104 battery level may be known only at the wireless communication device 104. So it may be beneficial for the wireless communication device 104 to allow autonomous x value selection.

Based on pathloss information or the wireless communication device's 104 battery level (which may be measured on the wireless communication device 104 side through downlink reference signal reception), the wireless communication device 104 may select x autonomously. For example, when the wireless communication device 104 measures the downlink reference signal and notices the large antenna gain imbalance (or large pathloss difference), the wireless communication device 104 may set the value of x to 1 without any signaling to the base station 102. As another example, when the wireless communication device 104 measures the battery level and notices the battery level is low, the wireless communication device 104 may set the value of x to 1 without any signaling to the base station 102.

On the other hand, if the base station 102 can estimate the uplink channel and antenna gain imbalance (e.g., via channel estimation employing channel reciprocity or feedback from the wireless communication device 104) or the battery status at the wireless communication device 104, the base station 102 can configure the value of x to be used at the wireless communication device 104 and hence the network can avoid unexpected behavior by the wireless communication device 104.

The PDCCH may include the antenna port weighting bit explicitly. For example, if x={1,sqrt(½), 0}, at least two bits may be needed to indicate the x value to the wireless communication device 104. The PDCCH may carry two bits to indicate the x value to the wireless communication device 104. Another solution may be for the PDCCH to include the antenna port weighting bit implicitly. For example, an identifier for the wireless communication device 104 can be masked with implicit signaling that stands for x indexes as shown in FIG. 28.

The base station 102 may select the value of x based on pathloss information that is reported from the wireless communication device 104 (e.g., reference signal received power). Alternatively, the base station 102 may select the value of x based on pathloss information that is measured on the base station 102 side through SRS reception. In either case, the base station 102 may configure x via PDCCH.

Figure 29:
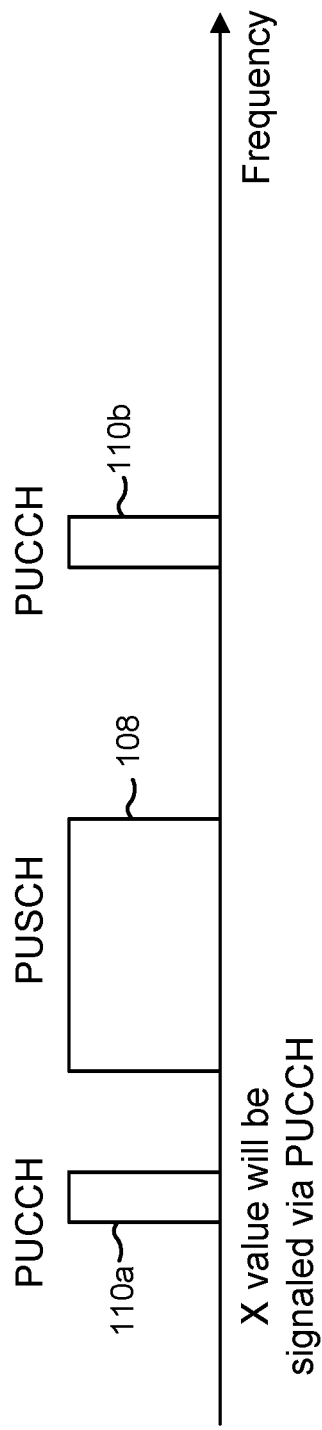
FIG. 29 illustrates an example showing how a wireless communication device may notify a base station that it has overwritten an antenna port weighting process parameter (x)
Figure 30:
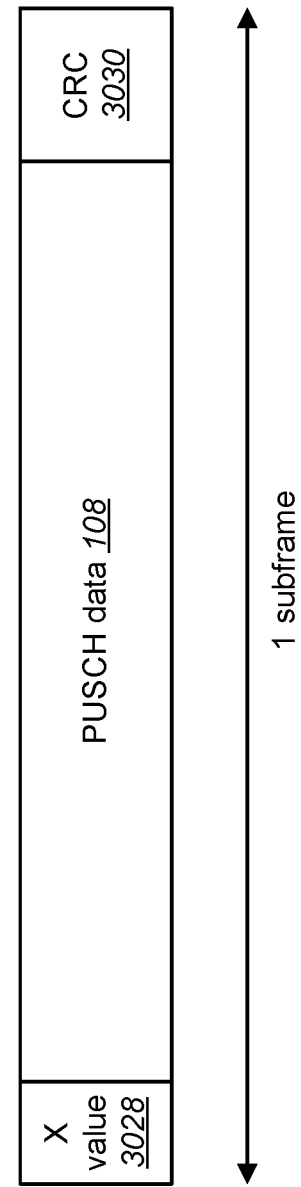
FIG. 30 illustrates another example showing how a wireless communication device may notify a base station that it has overwritten an antenna port weighting process parameter (x)
Figure 31:
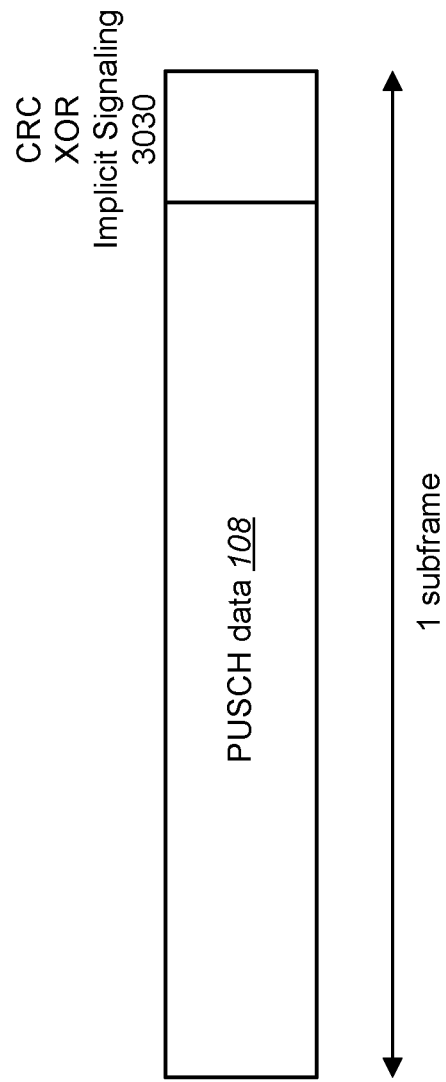
FIG. 31 illustrates another example showing how a wireless communication device may notify a base station that it has overwritten an antenna port weighting process parameter (x)
Figure 32:
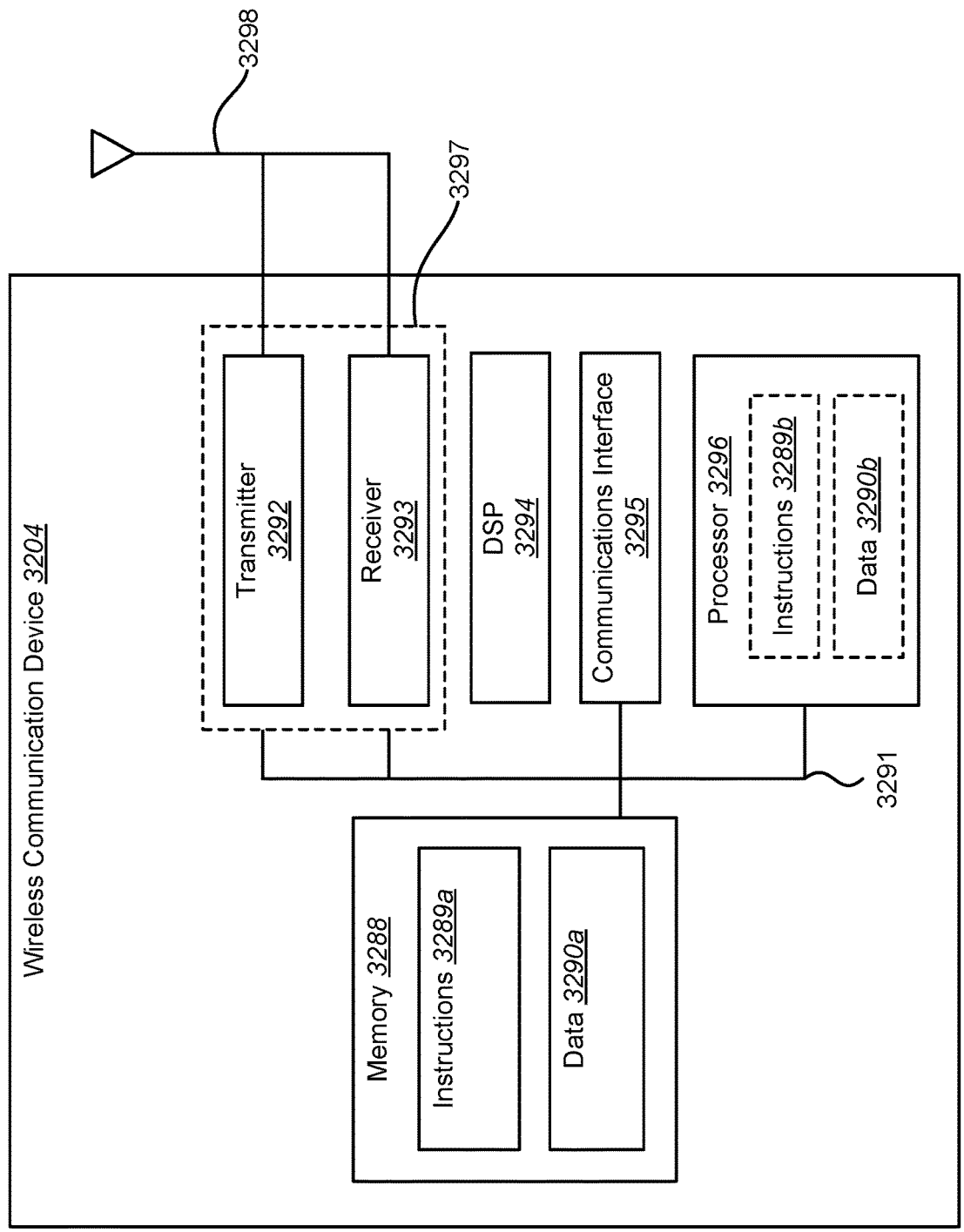
FIG. 32 illustrates various components that may be utilized in a wireless communication device.

The wireless communication device 104 may overwrite the value of x that was configured by the base station 102. In the event that the wireless communication device 104 overwrites the configured x value sent by the base station 102 over the PDCCH, there may be a need for the wireless communication device 104 to signal to the base station 102 the choice of the x value. This may be accomplished with PUSCH 108 transmission. For example, as shown in FIG. 29, the wireless communication device 104 may send PUSCH 108 and PUCCH 110a, 110b at the same subframe, and the PUCCH 110a may carry the x value that is used in PUSCH 108 transmission. As another example, the PUSCH 108 may carry the x value 3028 as control information as shown in FIG. 30. The symbol and subcarriers that carry the x value 3028 may use a pre-defined x value 3028 (for example, "x=1"), and the remaining parts may be decoded assuming the "received x value" is used for them. As another example, as shown in FIG. 31, the CRC 3030 in the PUSCH 108 may be masked by the "x value" 3028. In this case, the base station 102 may decode the received PUSCH 108 multiple times by trying multiple x values 3028 as a parameter.

If the base station 102 detects that the wireless communication device 104 transitioned to single antenna port mode 114a autonomously by an estimated "x value" via PUSCH 108 reception, the base station 102 may consider that the wireless communication device 104 has autonomously transitioned from multiple antenna port mode 114b to single antenna port mode 114a.

Figure 33:
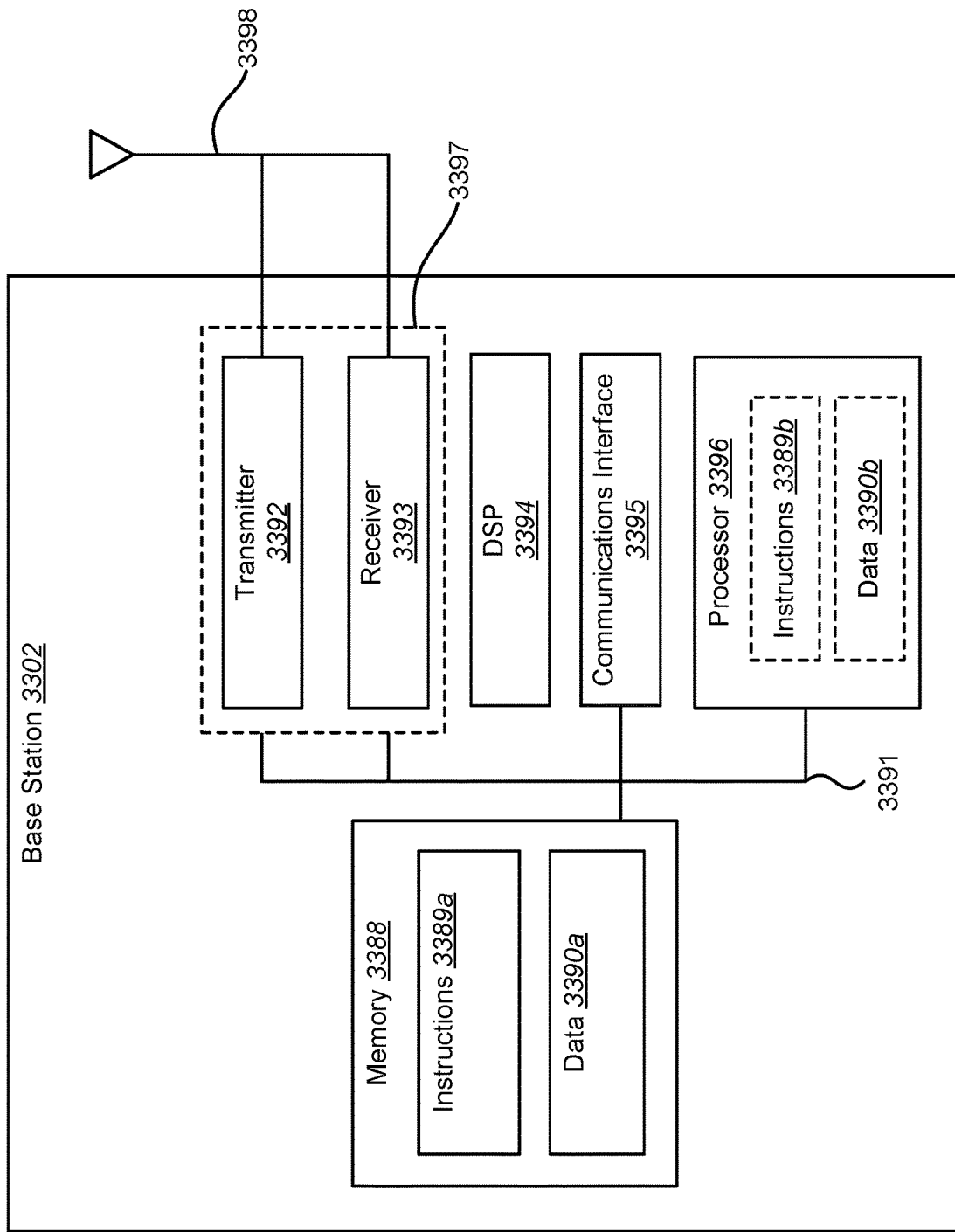
FIG. 33 illustrates various components that may be utilized in a base station.

FIG. 33 illustrates various components that may be utilized in a wireless communication device 3304. The wireless communication device 3304 may be utilized as the wireless communication device 104 in FIG. 1. The wireless communication device 3304 includes a processor 3396 that controls operation of the wireless communication device 3304. The processor 3396 may also be referred to as a CPU. Memory 3388, which may include both read-only memory (ROM), random access memory (RAM) or any type of device that may store information, provides instructions 3389a and data 3390a to the processor 3396. A portion of the memory 3388 may also include non-volatile random access memory (NVRAM). Instructions 3389b and data 3390b may also reside in the processor 3396. Instructions 3389b loaded into the processor 3396 may also include instructions 3389a from memory 3388 that were loaded for execution by the processor 3396. The instructions 3389b may be executed by the processor 3396 to implement the methods disclosed herein.

The wireless communication device 3304 may also include a housing that contains a transmitter 3392 and a receiver 3393 to allow transmission and reception of data. The transmitter 3392 and receiver 3393 may be combined into a transceiver 3397. An antenna 3398 is attached to the housing and electrically coupled to the transceiver 3397. Additional antennas may also be used.

The various components of the wireless communication device 3304 are coupled together by a bus system 3391 which may include a power bus, a control signal bus, and a status signal bus, in addition to a data bus. However, for the sake of clarity, the various buses are illustrated in FIG. 33 as the bus system 3391. The wireless communication device 3304 may also include a digital signal processor (DSP) 3394 for use in processing signals. The wireless communication device 3304 may also include a communications interface 3395 that provides user access to the functions of the communication device 3302. The wireless communication device 3304 illustrated in FIG. 33 is a functional block diagram rather than a listing of specific components.

FIG. 34 illustrates various components that may be utilized in a base station 3402. The base station 3402 may be utilized as the base station 102 in FIG. 1. The base station 3402 may include components that are similar to the components discussed above in relation to the wireless communication device 3304, including a processor 3406, memory 3488 that provides instructions 3489a and data 3490a to the processor 3496, instructions 3489b and data 3490b that may reside in the processor 3496, a housing that contains a transmitter 3492 and a receiver 3493 (which may be combined into a transceiver 3497), an antenna 3498 electrically coupled to the transceiver 3497, a bus system 3491, a DSP 3494 for use in processing signals, a communications interface 3495, and so forth.

Each of the methods disclosed herein comprises one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment comprising:
transmitting circuitry configured to transmit a physical uplink shared channels (PUSCH) in a subframe on a first uplink component carrier and a physical uplink control channel (PUCCH) in the subframe on a second uplink component carrier; and
uplink power control circuitry configured to determine a transmission power in the subframe for the first uplink component carrier and the second uplink component carrier; wherein
the PUSCH is dropped in a case that a total transmission power exceeds a maximum transmission power of the user equipment,
the total transmission power is a sum of transmission powers of the PUSCH and a transmission power of the PUCCH, and
the maximum transmission power of the user equipment is defined based on a user equipment (UE) power class of the user equipment.

2. The user equipment according to claim 1, wherein
the transmission power for the first uplink component carrier and second uplink component carrier is determined at least based on pathloss of each of the first uplink component carrier and the second uplink component carrier.

3. A method for a user equipment, the method comprising:
transmitting a physical uplink shared channels (PUSCH) in a subframe on a first uplink component carrier and a physical uplink control channel (PUCCH) in the subframe on a second uplink component carrier; and
determining a transmission power in the subframe for the first uplink component carrier and the second uplink component carrier; wherein
the PUSCH is dropped in a case that a total transmission power exceeds a maximum transmission power of the user equipment,
the total transmission power is a sum of transmission powers of the PUSCH and a transmission power of the PUCCH, and
the maximum transmission power of the user equipment is defined based on a user equipment (UE) power class of the user equipment.

4. The method according to claim 3, wherein
the transmission power for the first uplink component carrier and the second uplink component carrier is determined at least based on pathloss of each of the first uplink component carrier and the second uplink component carrier.

* * * * *